United States Patent
Kato et al.

(10) Patent No.: US 10,189,289 B2
(45) Date of Patent: Jan. 29, 2019

(54) TAPE INCLUDING LABEL PART AND ATTACHMENT PART SEPARABLE THEREFROM AND TAPE CARTRIDGE ACCOMMODATING THE SAME

(71) Applicant: Brother Kogyo Kabushiki Kaisha, Nagoya-shi, Aichi-ken (JP)

(72) Inventors: Tsutomu Kato, Nagoya (JP); Shimako Nakai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/718,026

(22) Filed: Sep. 28, 2017

(65) Prior Publication Data
US 2018/0015748 A1  Jan. 18, 2018

Related U.S. Application Data

(63) Continuation of application No. PCT/JP2016/070998, filed on Jul. 15, 2016.

(30) Foreign Application Priority Data

Jul. 24, 2015 (JP) ................................ 2015-146728

(51) Int. Cl.
*B41J 15/04* (2006.01)
*B41J 17/32* (2006.01)
(Continued)

(52) U.S. Cl.
CPC ............. *B41J 15/044* (2013.01); *B32B 7/06* (2013.01); *B41J 3/4075* (2013.01); *B41J 17/32* (2013.01);
(Continued)

(58) Field of Classification Search
CPC . B41J 11/02; B41J 11/04; B41J 11/053; B41J 11/057; B41J 11/13; B41J 11/10;
(Continued)

(56) References Cited

FOREIGN PATENT DOCUMENTS

| JP | S64-003877 U | 1/1989 |
|----|--------------|--------|
| JP | 2001-154586 A | 6/2001 |

(Continued)

OTHER PUBLICATIONS

Jan. 30, 2018—(WO) International Preliminary Report on Patentability—App PCT/JP2016/070998, Eng Tran.
(Continued)

*Primary Examiner* — Kristal Feggins
(74) *Attorney, Agent, or Firm* — Banner & Witcoff, Ltd.

(57) ABSTRACT

A tape includes a release sheet, a main label portion, and a subordinate label portion. The release sheet has an elongated rectangular shape having a length in a first direction greater than a length in a second direction perpendicular to the first direction. The main label portion is affixed to the release sheet and contains a fold line extending in one of the first direction and the second direction. The subordinate label portion is affixed to the release sheet and is arrayed with the main label portion in one of the first and the second directions. The subordinate label portion is separate from the main label portion, or is integrally connected to the main label portion through a portion having a width smaller than that of the subordinate label portion.

23 Claims, 31 Drawing Sheets

(51) Int. Cl.
  *G09F 3/02* (2006.01)
  *G09F 3/10* (2006.01)
  *B32B 7/06* (2006.01)
  *B41J 3/407* (2006.01)
(52) U.S. Cl.
  CPC ............... *G09F 3/02* (2013.01); *G09F 3/10* (2013.01); *B32B 2519/00* (2013.01); *G09F 2003/0201* (2013.01); *G09F 2003/0229* (2013.01)
(58) Field of Classification Search
  CPC . B41J 11/08; B41J 11/06; B41J 15/044; B41J 3/4075
  See application file for complete search history.

(56) References Cited

FOREIGN PATENT DOCUMENTS

| | | |
|---|---|---|
| JP | 2003-058062 A | 2/2003 |
| JP | 2014-188801 A | 10/2014 |
| WO | 2009-109706 A2 | 9/2009 |

OTHER PUBLICATIONS

Sep. 27, 2016—International Search Report—Intl App PCT/JP2016/070998.

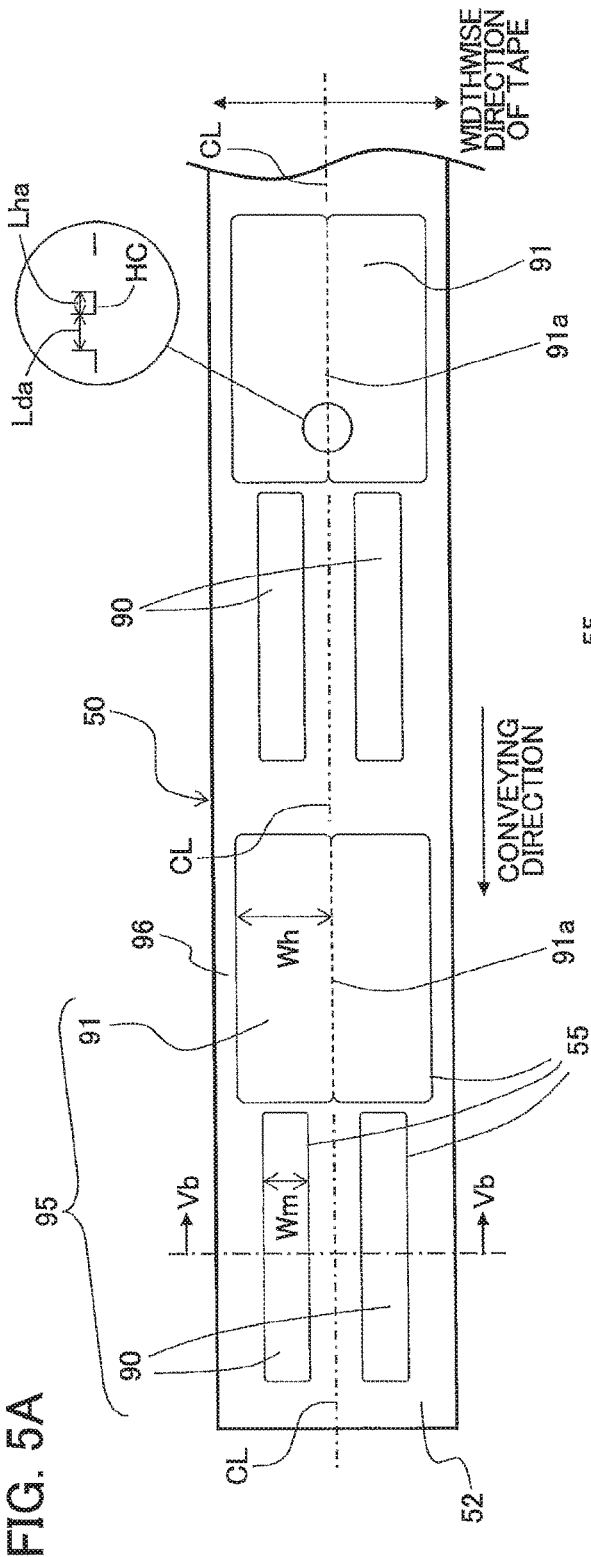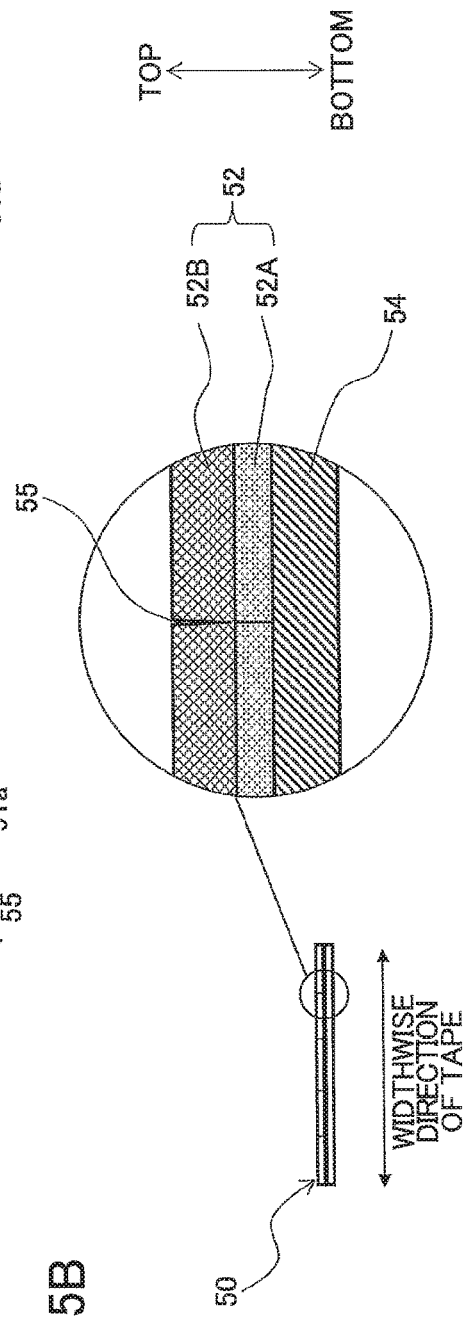
FIG. 5A
FIG. 5B

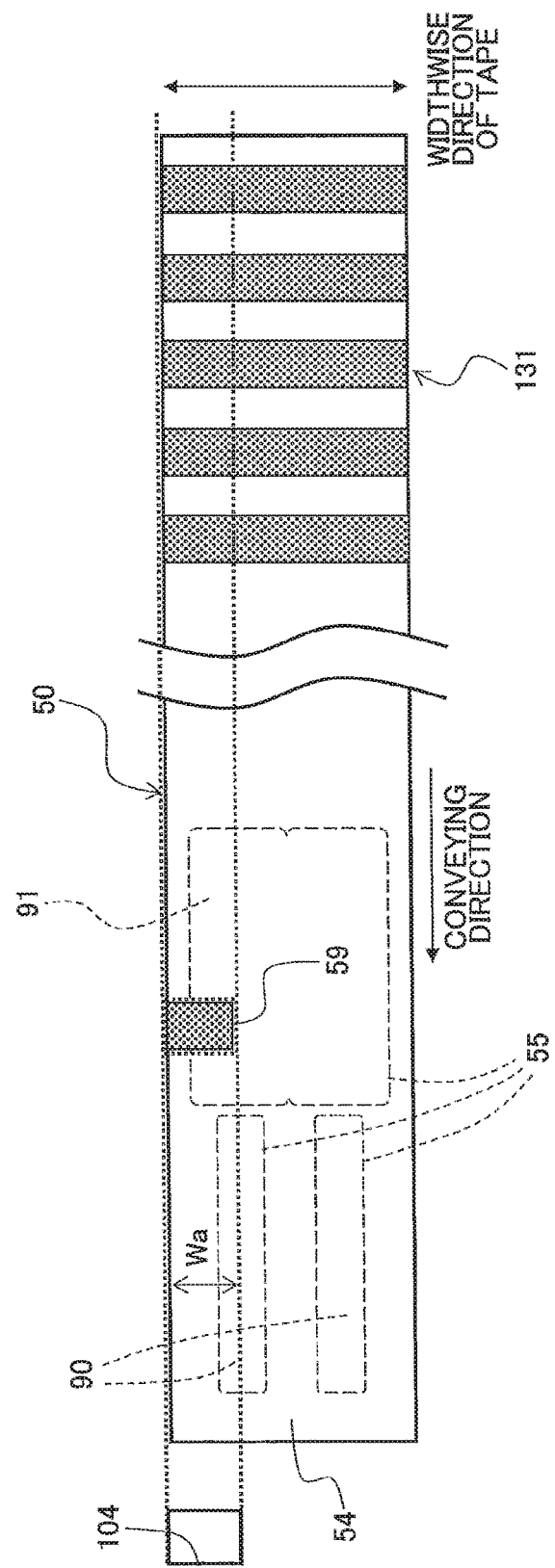

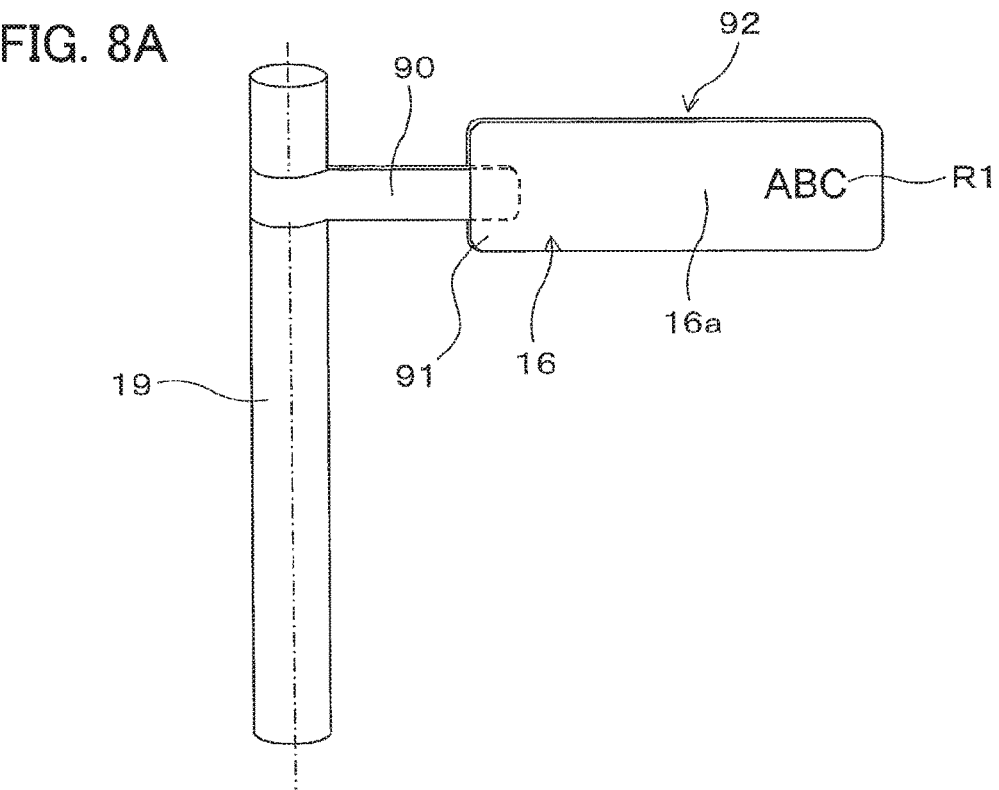
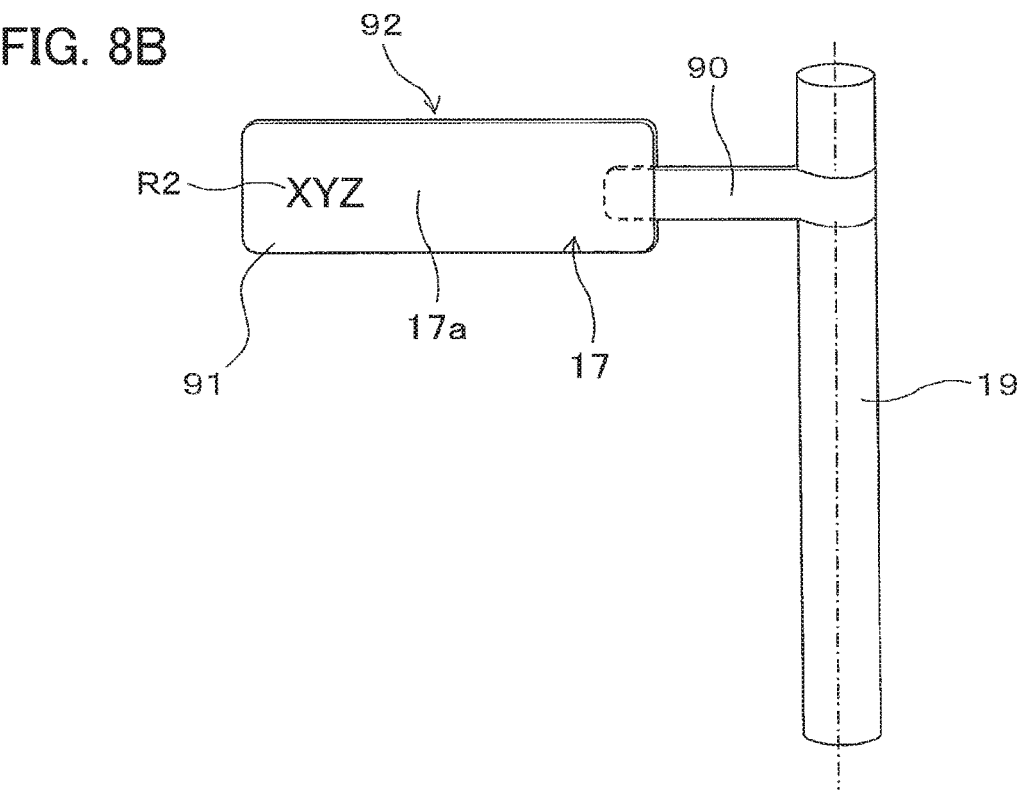

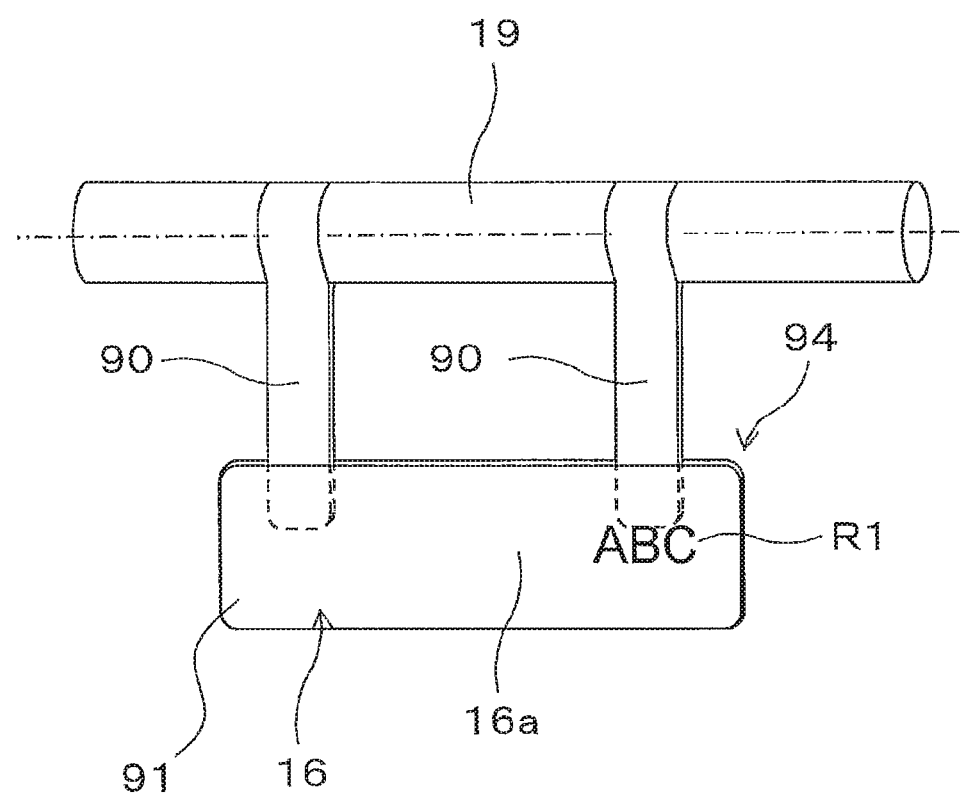

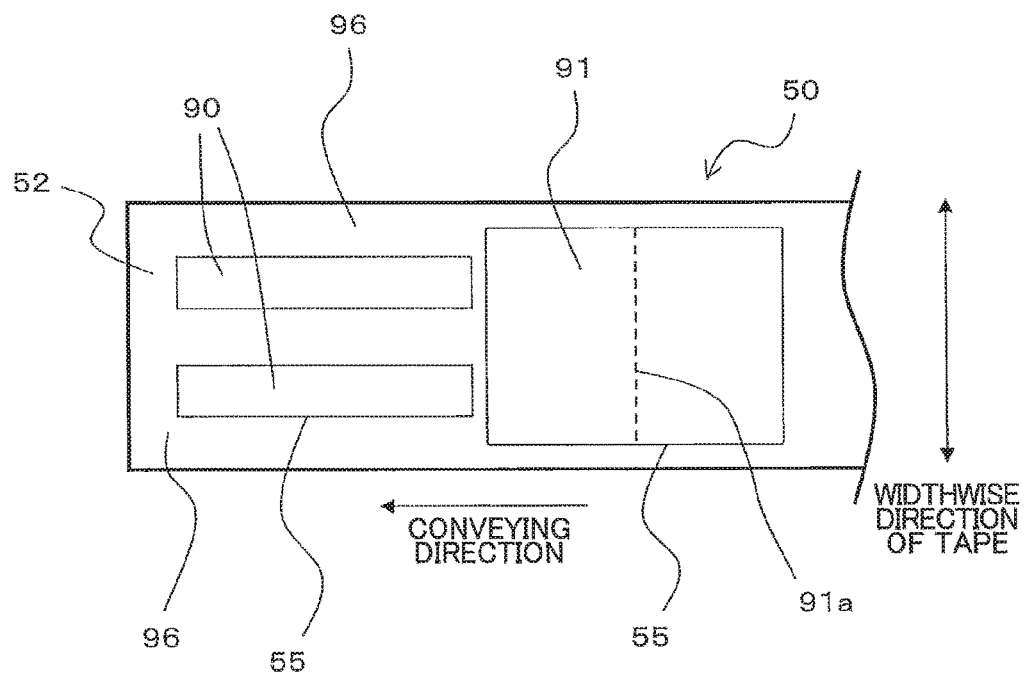

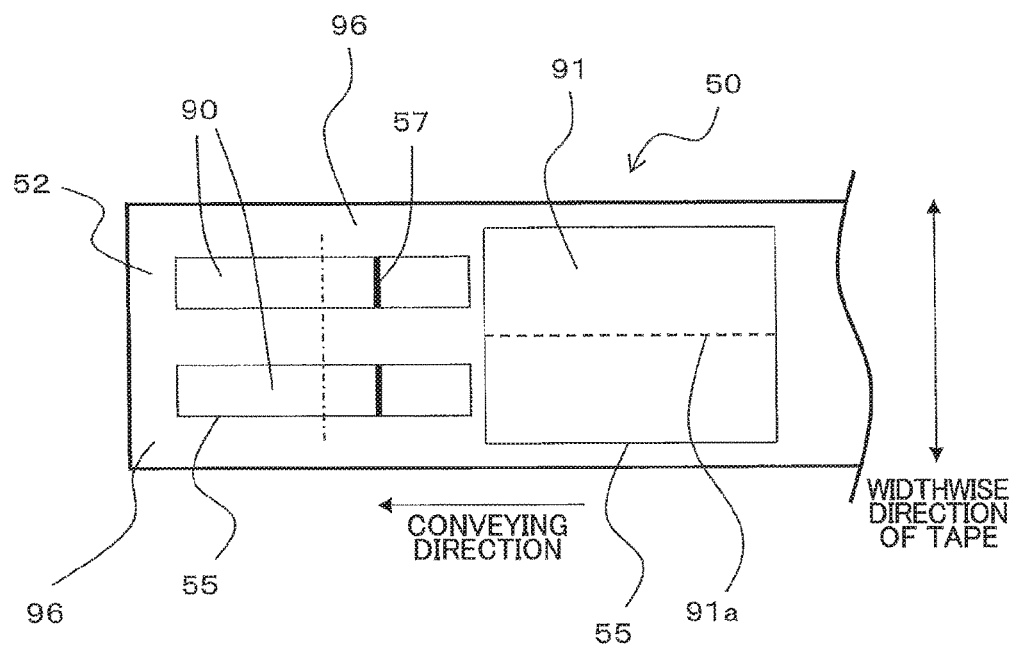

US 10,189,289 B2

TAPE INCLUDING LABEL PART AND ATTACHMENT PART SEPARABLE THEREFROM AND TAPE CARTRIDGE ACCOMMODATING THE SAME

CROSS REFERENCE TO RELATED APPLICATION

This application is a by-pass continuation of International Application No. PCT/JP2016/070998 filed Jul. 15, 2016 claiming priority from Japanese Patent Application No. 2015-146728 filed Jul. 24, 2015. The entire contents of the priority application and the international application are incorporated herein by reference.

TECHNICAL FIELD

The present disclosure relates to a tape on which a desired written content is printed, and to a tape cartridge provided with a tape roll around which the tape is wound.

BACKGROUND

There is conventionally known a printing label obtained by printing a desired character or graphic form on a printing tape in which a cut is formed (see, for example, Japanese Patent Application Publication No. 2003-58062). According to the prior art, a printing sheet having a back surface on which an adhesive is applied and a front surface on which printing is to be performed is temporarily attached to a base sheet having a front surface on which releasing agent is applied, whereby a printing tape is obtained. The above-mentioned cut is previously formed in only the printing sheet including the adhesive, and thus, only the printing sheet serving as the printing label can be peeled off from the printing tape and then stuck to an adherend.

The above printing label integrally includes a rectangular display part on which a predetermined printing is formed and a rectangular attachment portion extending outward from one end side of the display part. At the time of use of the printing label, the printing label is peeled off from the release sheet, then the display part is folded in half and layered, and then the attachment portion is stuck to an adherend, whereby the printing label can be used as a tag.

SUMMARY

However, in the above-described conventional technique, the display part and the attachment portion are integrally formed, so that the direction of the display part on which a printing is formed is fixed with respect to the direction of the attachment portion attached to an adherent. That is, the direction of the printing is determined by the attachment direction of the attachment portion with respect to the adherend, which may make it difficult to read the printing.

The object of the present disclosure is to provide a tape having a high degree of freedom when being attached to an adherend thereby improving user's convenience and to provide a tape cartridge provided with the tape.

In order to attain the above and other objects, according to one aspect, the disclosure provides a tape including a release sheet, a main label portion, and a subordinate label portion. The release sheet has an elongated rectangular shape. The release sheet has a length in a first direction greater than a length in a second direction perpendicular to the first direction. The main label portion is affixed to the release sheet and contains a fold line extending in one of the first direction and the second direction. The subordinate label portion is affixed to the release sheet and is arrayed with the main label portion in one of the first direction and the second direction. The subordinate label portion is separate from the main label portion, or is integrally connected to the main label portion through a portion having a width smaller than that of the subordinate label portion.

Further, according to another aspect, there is provided a tape cartridge including a casing, a tape roll which is a winding of a tape and is accommodated in the casing, and an ink ribbon. The tape includes a release sheet, a main label portion and the subordinate label portion. The release sheet has an elongated rectangular shape. The release sheet has a length in a first direction greater than a length in a second direction perpendicular to the first direction. The main label portion is affixed to the release sheet and contains a fold line extending in one of the first direction and the second direction. The subordinate label portion is affixed to the release sheet and is arrayed with the main label portion in one of the first direction and the second direction. The subordinate label portion is separate from the main label portion, or is integrally connected to the main label portion through a portion having a width smaller than that of the subordinate label portion. The ink ribbon roll is a winding of an ink ribbon and is accommodated in the casing.

BRIEF DESCRIPTION OF THE DRAWINGS

The particular features and advantages of the embodiment(s) as well as other objects will become apparent from the following description taken in connection with the accompanying drawings, in which:

FIG. 5A is a plan view of a printing tape;

FIG. 5B is a transverse cross-sectional view taken along a line Vb-Vb in FIG. 5A;

FIG. 6 is a plan view of the printing tape as viewed from a release sheet side;

FIGS. 8A and 8B are views representing a using mode of the P-type label;

FIG. 11 is a view representing a using mode of a π-type label;

FIG. 19 is a plan view of a printing tape including a label main body part in which a perforation line extends in a widthwise direction of the tape at a center position of the label main body part in the conveying direction according to a modification;

FIG. 20 is a plan view of a printing tape including a winding part in which a mark line is formed at a deviated position in the conveying direction according to a modification;

DETAILED DESCRIPTION

Figure 1:
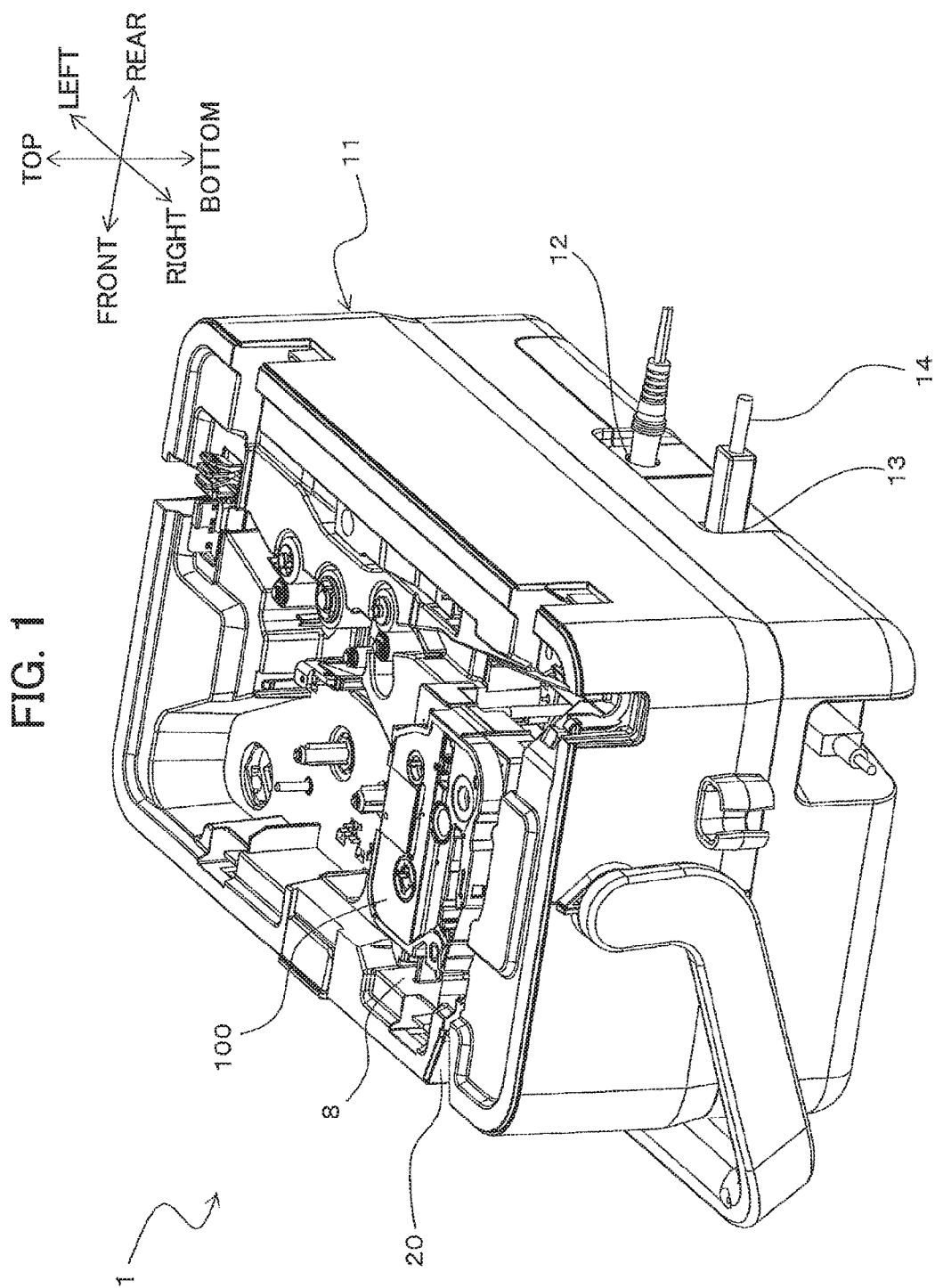
FIG. 1 is a perspective view of a printing device mounting thereon a tape cartridge according to a first embodiment of the present disclosure.

An embodiment according to the present disclosure will be described with reference to drawings. The terms "front", "rear", "left", "right", "top" and "bottom" described in the description are indicative of the directions described in the drawings such as "front", "rear", "left", "right", "top" and "bottom".

[Entire Structure of Printing Device]

In FIG. 1, a printing device 1 according to the present embodiment can selectively execute printing on a printing tape 50 and printing on a printing tube (not illustrated). The printing tape 50 corresponds to a tape described in the claims. While the printing device 1 can execute both the printing on the printing tape 50 and printing on the printing tube in the above description, it may be configured to execute only the printing on the printing tape 50.

The printing device 1 can use various types of tape cartridges 100 such as a thermal type, a receptor type, and a laminate type. The tape cartridge 100 corresponds to a tape cartridge described in the claims. Hereinafter, the printing device 1 is assumed to use the tape cartridge 100 of a receptor type. Further, the printing device 1 can use both the tape cartridges 100 of a type (die-cut label type) in which a cut is formed in a printing sheet of the printing tape 50 so as to divide the printing sheet into a label part and a non-label part and of a type not having the above cut in the printing sheet of the printing tape 50. In the example of FIG. 1, the tape cartridge 100 of a die-cut label type is used.

The printing device 1 includes a substantially rectangular parallelepiped main body part 11 and a cover (not illustrated) that opens/closes an upper opening of the main body part 11. In a state where the cover is attached to the main body part 11 (FIG. 1 shows the printing device 1 uncovered), the cover is pivotally movably supported to an upper left end portion of the main body part 11. A power supply connector 12 and a USB (Universal Serial Bus) connector 13 are provided on rear lower surface portion of the main body part 11. The printing device 1 is connected to an operation terminal 300 (see FIG. 4) through a USB cable 14 (see FIG. 4) connected to the USB connector 13. The printing device 1 receives printing data edited in the operation terminal 300 and performs desired printing on the printing tape 50 (see FIGS. 2 and 3) based on the printing data. The printing device 1 and operation terminal 300 may be connected by wireless communication. While the printing device 1 is configured to execute printing based on operation of the operation terminal 300 in the above description, it may be configured to execute printing based on operation in an operation part provided therein (so-called stand-alone type).

A cartridge holder 8 having a recessed shape to which the tape cartridge 100 provided with the printing tape 50 can be detachably attached is provided at a position close to the right side of the upper surface of the main body part 11. To make clear the structure, FIG. 1 illustrate the tape cartridge 100 positioned higher than an actual mounting position of the tape cartridge 100 relative to the cartridge holder 8.

A discharge port 20 is provided at a position close to the right side of the front surface of the main body part 11. The printing tape 50 after printing by a thermal head 22 to be described later is discharged while being conveyed by a platen roller 25 to be described later from the cartridge holder 8 to the outside of the printing device 1 through the discharge port 20.

[Internal Structure of Printing Device]

Figure 2:
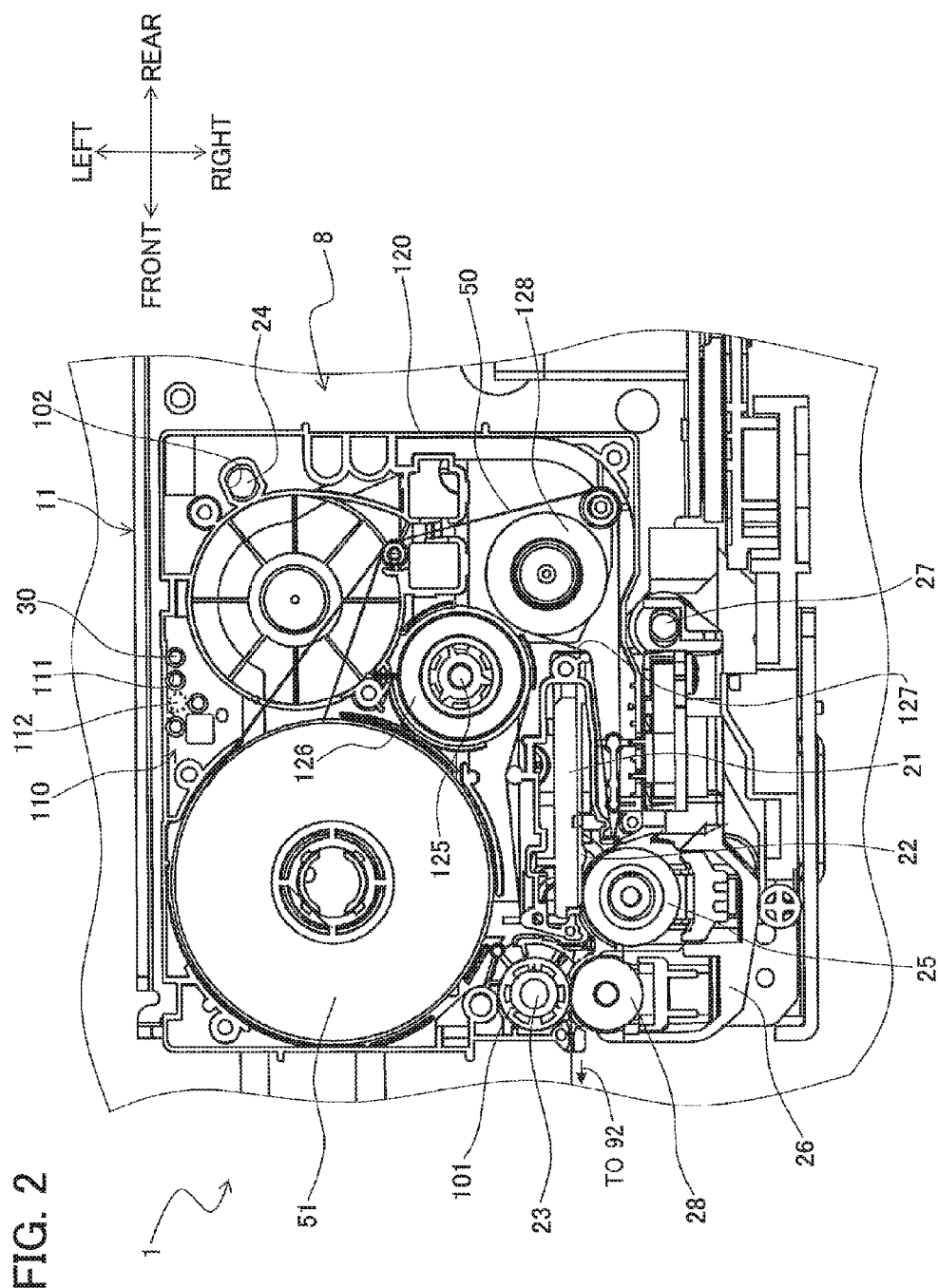
FIG. 2 is a plan view illustrating a cartridge holder on which the tape cartridge is mounted and also illustrating a structure ambient to the cartridge holder in the printing device.

The internal structure of the printing device 1 will be described. As illustrated in FIGS. 1 and 2 and as described above, the cartridge holder 8 to which the tape cartridge 100 can be detachably attached is provided at the upper portion of the main body part 11. A head holder 21 formed of a plate-like member extending in the front-rear direction upstands at a position close to the right side and at a substantially center portion of the cartridge holder 8 in the front-rear direction. The thermal head 22 provided with heating elements (not illustrated) is provided on the upper surface of the head holder 21. The thermal head 22 uses an ink ribbon 127 to be described later to perform printing on the printing tape 50 supplied from the tape cartridge 100 and conveyed by the platen roller 25 along a predetermined conveying path.

A ribbon take-up shaft 125 upstands at the left of the head holder 21. The ribbon take-up shaft 125 is fitted into an inside of a ribbon take-up roller 126 provided in the tape cartridge 100 and drives the ribbon take-up roller 126 into rotation. The tape cartridge 100 further includes a rotatably supported ink supply side roll 128. An ink ribbon 127 is wound around the ink supply side roll 128. The ribbon take-up roller 126 is driven into rotation by the ribbon take-up shaft 125 to pull out the ink ribbon 127 from the ink supply side roll 128 and wind the used ink ribbon 127.

A feed roller drive shaft 23 upstands at a position frontward of the head holder 21. The feed roller drive shaft 23 is a shaft body that can be detachably attached to a feed roller 101 of the tape cartridge 100. A guide shaft 24 upstands at a position close to the left corner of the cartridge holder 8. The guide shaft 24 is a shaft body that can be detachably attached to a guide hole 102 of the tape cartridge 100.

A drive motor 66 (see FIG. 4) which is a stepping motor is disposed below the cartridge holder 8 of the main body part 11. The feed roller drive shaft 23 and the platen roller 25 to be described later are connected to the drive motor 66 through a plurality of gears not illustrated. With the drive of the drive motor 66, the ribbon take-up shaft 125 (ribbon take-up roller 126), feed roller drive shaft 23 (feed roller 101), and the platen roller 25 are rotated.

A cartridge sensor 31 (see FIG. 4) having a plurality of (five, in this embodiment) upstanding push-down sensor projections 30 is provided on a lower support surface at a left side of substantially center of the cartridge holder 8 in the front-rear direction. When the tape cartridge 100 is attached to the cartridge holder 8, a detected part 110 (the details will be described later) provided in the tape cartridge 100 faces the sensor projections 30, and each one of the sensor projection 30 is selectively pushed down by the detected part 110 in accordance with a type of the tape cartridge (in other words, in accordance with a shape of a label part 95 described later). The cartridge sensor 31 outputs a detection signal indicative of type information (in other words, shapes of a winding part 90 and a label main body part 91) of the tape cartridge 100 based on a combination of ON and OFF of the sensor projections 30.

An arm-like platen holder 26 extending in the front-rear direction is disposed outside the upper portion of the cartridge holder 8 of the main body part 11. The platen holder 26 is pivotally movably supported about a pivot part 27. The platen roller 25 and a pressure contact roller 28 are rotatably supported to a front end portion of the platen holder 26. The platen roller 25 faces the thermal head 22 and can contact with and separate from the thermal head 22. The pressure contact roller 28 faces the feed roller 101 and can contact with and separate from the feed roller 101. When the platen holder 26 is pivotally moved toward the cartridge holder 8, the platen roller 25 moves to a printing position contacting the thermal head 22, so that the platen roller 25 presses the thermal head 22 through the printing tape 50. At the same time, the pressure contact roller 28 presses the feed roller 101 through the printing tape 50. In this state, the printing tape 50 in the tape cartridge 100 is conveyed with the rotation of the feed roller 101, platen roller 25, and pressure contact roller 28, and printing on the printing tape 50 is performed by the thermal head 22.

[Structure of Cartridge]

Figure 3:
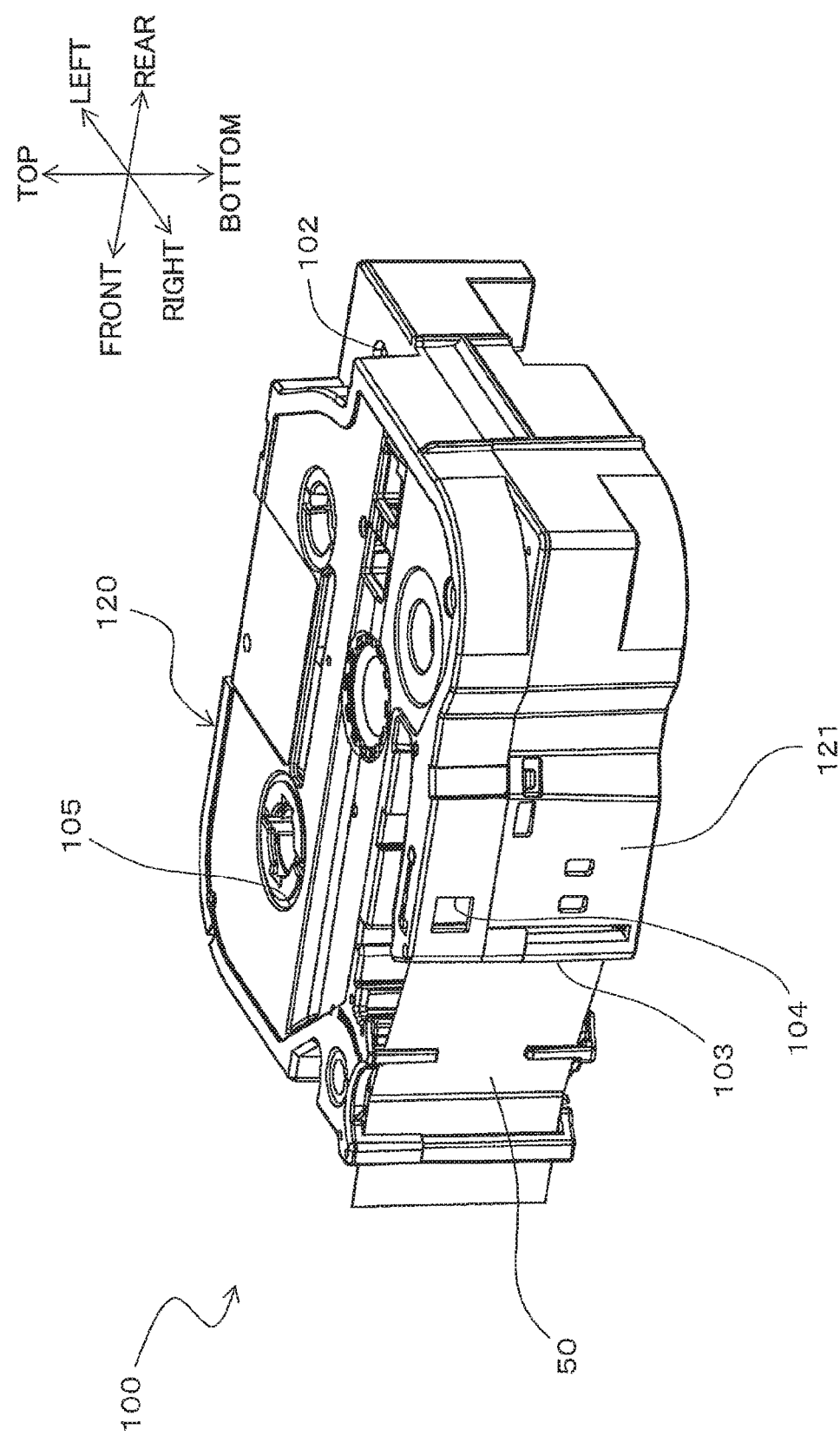
FIG. 3 is a perspective view illustrating an entire appearance of the tape cartridge.

A structure of the tape cartridge 100 will be described with reference to FIGS. 2 and 3. As illustrated in FIG. 3, the tape cartridge 100 includes a substantially rectangular parallelepiped (box-like) casing 120 having rounded corners as a whole in a plan view. A tape supply port 103 is provided at the front side of the right surface of the casing 120, and the printing tape 50 is pulled out from the tape supply port 103, so as to be supplied. Further, a through-hole 104 is provided in the vicinity of the upper portion of the tape supply port 103 for optically detecting a sensor mark (not illustrated) previously printed on the printing tape 50. The sensor mark is used for controlling position of the printing tape 50 during its feeding.

A tape roll support hole 105 is provided at a front portion of an upper portion of the casing 120 for rotatably supporting a printing tape roll 51 (tape roll) which is a roll of the printing tape 50 at a position interior of the casing 120. As illustrated in FIG. 2, the printing tape 50 is pulled out from the printing tape roll 51, subjected to printing by the thermal head 22, and then guided to the discharge port 20 of the main body part 11.

The above-described detected part 110 indicating the type information of the tape cartridge 100 is provided at substantially center portion in the front-rear direction on a lower surface of the casing 120. The detected part 110 faces the five sensor projections 30 of the cartridge sensor 31 provided at the main body part 11, and includes an insertion hole part 111 and a surface part 112 formed on the lower surface. A combination of the insertion hole part(s) and the surface part(s) indicates the type information of the tape cartridge 100. As described above, in the present embodiment, the detected part 110 specifies the type information of the tape cartridge 100 including the shape of the winding part 90 and the label main body part 91 in the tape cartridge 100.

The insertion hole part 111 is a circular hole and functions as a non-push-down part that does not push down the sensor projection 30 when the tape cartridge 100 is attached to the cartridge holder 8. Thus, the sensor projection 30 facing the insertion hole 111 is rendered OFF. The surface part 112 functions as a push-down part that pushes down the sensor projection 30 when the tape cartridge 100 is attached to the cartridge holder 8. Thus, the sensor projection 30 facing the surface part 112 is rendered ON.

[Control Systems for Printing Device and Operation Terminal]

Control systems for the respective printing device 1 and operation terminal 300 will be described with reference to FIG. 4.

Figure 4:
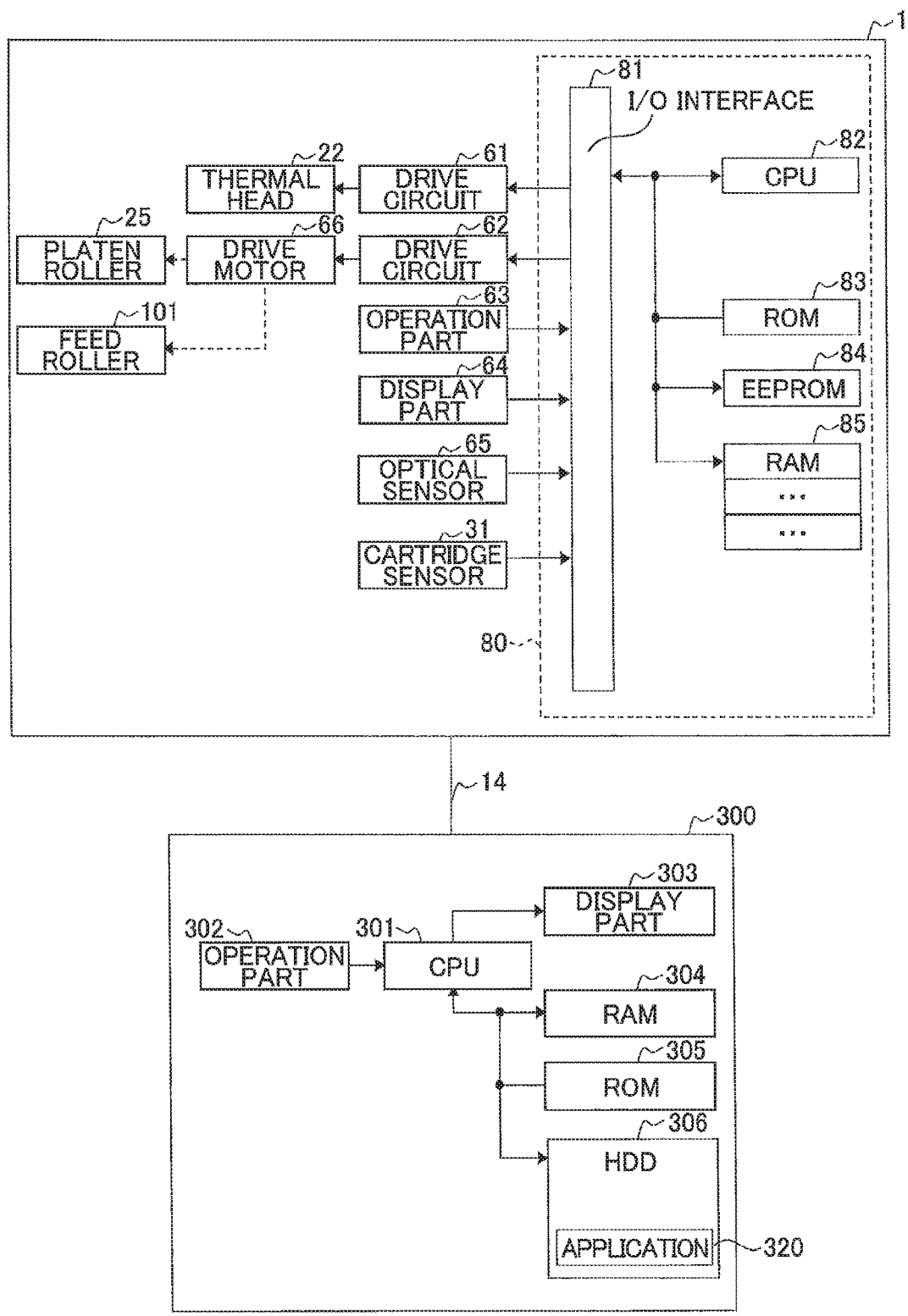
FIG. 4 is a block diagram illustrating functional structures of the printing device and an operation terminal.

As illustrated in FIG. 4, the printing device 1 is provided with a control system having a control circuit 80 which includes a CPU 82. In the control circuit 80, the CPU 82 is connected with a ROM 83, an EEPROM 84, a RAM 85, and an I/O interface 81 through a data bus. In place of the EEPROM 84, a non-volatile memory such as a flash memory may be used.

The ROM 83 stores various programs required to control the printing device 1. The CPU 82 performs various computations and processing based on the programs stored in the ROM 83.

The EEPROM 84 stores in a non-volatile manner various kinds of information on the printing tape 50 (for example, correlation of the result of detection by the cartridge sensor 31 as to the insertion hole part 111 and surface part 112 with the type information of the tape cartridge 100). The CPU 82 refers to the correlation with respect to the detection result concerning the tape cartridge 100 attached to the cartridge holder 8 to thereby acquire the type information of the currently attached tape cartridge 100.

The RAM 85 temporarily stores results of various computations executed by the CPU 82.

The I/O interface 81 is connected with a thermal head drive circuit 61, a motor drive circuit 62, an operation part 63, a display part 64, an optical sensor 65, and the cartridge sensor 31.

The thermal head drive circuit 61 controls the drive of the thermal head 22.

The motor drive circuit 62 controls the drive of the drive motor 66. Thus, as described above, rotation drive force is transmitted to the gear for platen roller and the gear for conveying roller (not illustrated) through the gears (not illustrated) to rotate the platen roller 25 and feed roller 101.

The optical sensor 65 irradiates sensor light to the printing tape 50 through the through-hole 104 formed in the casing 120 of the tape cartridge 100, and detects the presence/absence of its reflected light to thereby detect a conveying state of the printing tape 50.

As illustrated in FIG. 4, the operation terminal 300 is provided with a control system having a CPU 301. The CPU 301 is connected with an operation part 302, a display part 303, a RAM 304, a ROM 305, and an HDD 306.

The operation terminal 300 is connected to the printing device 1 through the USB cable 14 and can thus exchange signals with the printing device 1.

An application program 320 stored in the HDD 306 is executed in the operation terminal 300. With the application program 320, an operator operates the operation part 302 in the operation terminal 300 to create printing data for printing on a printing label 200 to be created in the printing device 1 and to transmit the created printing data to the printing device 1. That is, a predetermined label creation instruction including the printing data is output to the printing device 1 by a user operation on the operation part 302. Then, in the printing device 1, the platen roller 25 and feed roller 101 are driven through the motor drive circuit 62 and the drive motor 66, so that the printing tape 50 is drawn out from the printing tape roll 51. In synchronization with this operation, a plurality of heating elements of the thermal head 22 are selectively heated through the thermal head drive circuit 61, so that an ink of the ink ribbon 127 taken out from the ink supply side roll 128 is transferred onto the printing tape 50 delivered and conveyed. Thus, printing based on the printing data is performed on the printing tape 50. Thereafter, the winding part 90 (will be described in detail later) and the label main body part 91 (will be described in detail later) are manually peeled off from the printing tape 50 on which printing is formed, whereby a printing label 200 (see FIG. 7) having a predetermined printing is generated. The above peel-off may be performed as follows. That is, the printing tape 50 on which printing has been performed is cut into a predetermined length by a cutter (not illustrated) provided near the discharge port 20 of the main body part 11, and then the cut printing tape is discharged from the discharge port 20. Then, the winding part 90 and label main body part 91 are peeled off from the discharged printing tape 50 cut into the predetermined length. The cutter may be activated for cutting the printing tape 50 when a cutter button not illustrated is operated.

Features of Present Embodiment

In an embodiment of the present disclosure, in order to create a P-type label or a T-type label (to be described later), two types of label parts including the label main body part and the winding part are formed in the above printing tape 50. The label main body part is a part on which e.g. a desired written content is printed by the printing device 1. The winding part is a part used to attach the label main body part to an adherend. That is, at the time of use, the winding part connected with the label main body part is attached to an adherend with the written content of the label main body part being directed to a desired direction.

In the present embodiment, the label main body part and the winding part are formed separately from each other. This allows the direction of the label main body part to be changed freely with respect to the winding part. The details will be described hereinafter.

[Printing Tape]

FIGS. 5A and 5B illustrate the printing tape 50 used in the present embodiment. FIG. 5A is a plan view of the printing tape 50 on which printing is not performed. In FIG. 5A, leftward direction is defined as a conveying direction (corresponding to a first direction), and up-down direction is defined as a widthwise direction of the tape (corresponding to a second direction). FIG. 5B is a cross-sectional view taken along line Vb-Vb in FIG. 5A.

As illustrated in a partially enlarged cross-sectional view of FIG. 5B, the printing tape 50 of this embodiment includes an adhesive sheet 52 and a release sheet 54 which are laminated from the top in this order in a thickness direction. The adhesive sheet 52 includes a base member 52B provided on the upper side thereof (see the partially enlarged view of FIG. 5B in which the up-down direction is defined (the same applies hereinafter)), and printing is formed on a printing surface of the base member 52B by the thermal head 22. The adhesive sheet 52 further includes an adhesive layer 52A below the base member 52B. The release sheet 54 is easily peelably stuck to the adhesive layer 52A. In other words, the adhesive sheet 52 is peelably stuck to the upper surface (corresponding to a first surface) of the release sheet 54. In the embodiment, the adhesive sheet 52 is stuck to an entire surface of the strip-like release sheet 54 whose length in the conveying direction is greater than the length in the widthwise direction, thereby constituting the printing tape 50.

In the present embodiment, half-cutting is previously applied to the printing tape 50 so as to create a P-type label 92 or a T-type label 93, which will be described later. As illustrated in the partially enlarged cross-sectional view of FIG. 5B, according to the half-cutting process, a cut line 55 is formed in the adhesive sheet 52 of the printing tape 50, whereby a so-called die-cut label is obtained. The half-cutting is applied so as to surround a predetermined area as illustrated in the plan view of FIG. 5A, thus allowing the adhesive sheet 52 in this area to be peeled off from the printing tape 50. In the present embodiment, a part of the adhesive sheet 52 to be peeled off is referred to as "label part 95", and the remaining part of the adhesive sheet 52 is referred to as "non-label part 96".

The label part 95 includes the winding part 90 and the label main body part 91. In the present embodiment, a plurality of sets each including two winding parts 90 and one label main body part 91 those separated from each other are previously formed along the lengthwise direction of the printing tape 50. In the present embodiment, predetermined printing (see printings R1 and R2) is applied to an internal area of the label main body part 91 by the above-described printing device 1.

The two winding parts 90 (corresponding to a subordinate label portion, a first subordinate label portion, a second subordinate label portion, or an attachment portion described in the claims) each having a substantially rectangular shape elongated in the conveying direction (in other words, longitudinal direction or lengthwise direction of the tape (the same applies hereinafter)) are disposed parallel to each other in the widthwise direction of the tape, and one label main body part 91 (main label portion or label described in the claims) having a substantially rectangular shape elongated in the conveying direction is disposed upstream of the two winding parts 90 in the conveying direction. An upstream end (right end in FIG. 5A) of each winding part 90 in the conveying direction and a downstream end (left end in FIG. 5A) of the label main body part 91 in the conveying direction are spaced apart from each other. Similarly, one end (lower end in FIG. 5A) of the upper-side winding part 90 in the widthwise direction of the tape and another end portion (upper end in FIG. 5A) of the lower-side winding part 90 in the widthwise direction of the tape are spaced apart from each other. The two winding parts 90 are disposed symmetric with respect to a symmetric axis CL extending in the conveying direction and passing through a center of the printing tape 50 in the widthwise direction of the tape. A plurality of sets each including the two winding parts 90 and one label main body part 91 having the above positional relationship as one set are arrayed in the same posture (direction) in the conveying direction of the printing tape 50.

A line of perforations 91a is previously formed in the label main body part 91 by the half-cut treatment. The perforation line extends in the conveying direction while passing through the center of the label main body part 91 in the widthwise direction of the tape. The perforation line 91a is formed as a folding line along which the label main body part 91 is folded. As illustrated in the partially enlarged cross-sectional view of FIG. 5A, as the perforation line 91a, half-cut lines HC each having a length Lha are formed intermittently at an interval of Lda. In this example, the interval Lda is set larger than the length Lha. The perforation line 91a is positioned on the same line as the symmetric axis CL. The folding line is not limited to the perforation lines 91a. That is, a line as the folding line may be previously printed without half-cutting on the same position as the perforation line 91a.

In the present embodiment, a length Wm (short side length) of the winding part 90 in the widthwise direction of the tape is set to equal to or less than a length Wh between the perforation line 91a and the end (upper end or lower end in FIG. 5A) of the label main body part 91 in the widthwise direction of the tape. (Wm≤Wh). A short side and a long side of the rectangle of the label main body part 91 illustrated in FIG. 5A correspond respectively to a first short side and a first long side described in the claims, and a short side and a long side of the rectangle of the winding part 90 illustrated correspond respectively to a second short side and a second long side described in the claims.

[Sensor Mark and Zebra Mark on Release Sheet]

As illustrated in FIG. 3, in the present embodiment, the through-hole 104 is formed in the side wall part 121 of the casing 120 of the tape cartridge 100 accommodating the printing tape 50, and the printing tape 50 is conveyed to pass through the through-hole 104 with the release sheet 54 facing the through-hole 104. Correspondingly, in the present embodiment, as illustrated in FIG. 6, sensor marks 59 are previously printed on the release sheet 54. Specifically, as illustrated in FIG. 6, the sensor marks 59 are printed at a predetermined interval (equal to an interval between the neighboring sets) on the release sheet 54 of the printing tape 50 at a position within a widthwise directional area Wa that passes through the through-hole 104 in a facing manner with the conveyance of the printing tape 50. The sensor mark 59 is a black solid mark having substantially the same shape and size as those of the through-hole 104. That is, the through-hole 104 is formed in the side wall part 121 of the casing 120 of the tape cartridge 100 so as to face the movement path of the sensor mark 59. In the printing device 1, the optical sensor 65 (see FIG. 4) optically detects the sensor mark 59 through the through-hole 104, and the CPU 82 sequentially detects the positions of the label main body parts 91 being conveyed based on detection results from the optical sensor 65, whereby positioning control of the printing tape 50 at the time of conveyance is achieved (detailed control are omitted here).

Further, a zebra mark 131 is printed on the tape end side (most upstream side of the entire printing tape 50) of the release sheet 54. The zebra mark 131 includes a plurality of black solid marks which extend in a strip shape in the widthwise direction of the tape and which are printed so as to be spaced apart from one another at short intervals in the conveying direction. The optical sensor 65 (or an optical sensor dedicated for tape end detection provided at a position different from that of the optical sensor 65) detects the zebra mark 131, so that the CPU 82 detects that substantially the entire printing tape 50 accommodated in the tape cartridge 100 has been consumed (tape end is reached). In the present embodiment, the thus configured sensor mark 59 and zebra mark 131 are printed on the release sheet 54 of the printing tape 50, whereby functional conveyance of the printing tape 50 in the printing device 1 can be achieved.

[Use Mode as P-Type Label and T-Type Label]

Figure 7A:
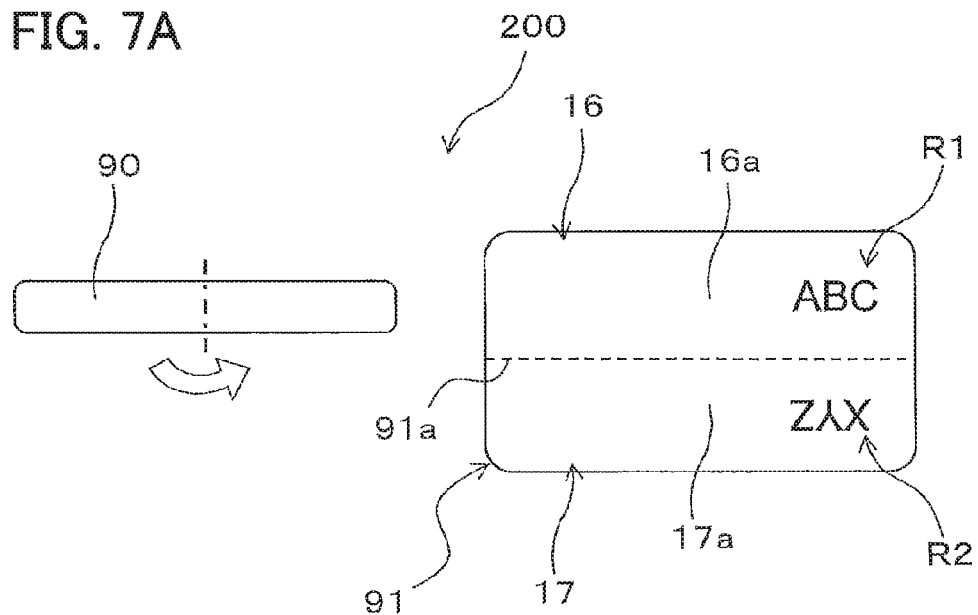
FIG. 7A is a plan view illustrating an outer appearance of a created printing label.

FIGS. 7A to 8B are views illustrating a case where a printing label 200 (winding part 90 and label main body part 91) peeled off from the printing tape 50 is used as the P-type label 92 (to be described later). In FIGS. 7A and 7B, the label main body part 91 has a first label area 16 and a second label area 17 which are connected to each other and arrayed in the up-down direction in the drawing. The first and second label areas 16 and 17 have the same rectangular shape elongated in the left-right direction in the drawing. The first label area 16 has a first printing surface 16a on which a printing R1 is formed by the printing device 1. The second label area 17 has a second printing surface 17a on which a printing R2 is formed by the printing device 1. In the illustrated example, a character string "ABC" is printed as an erected posture in the left-right direction with a right justification at the center of the first printing surface 16a in the up-down direction as the printing R1, and a character string "XYZ" is printed as an inverted image in a 180-degrees in the left-right direction with right justification at the center of the second printing surface 17a in the up-down direction as the printing R2.

Figure 7B:
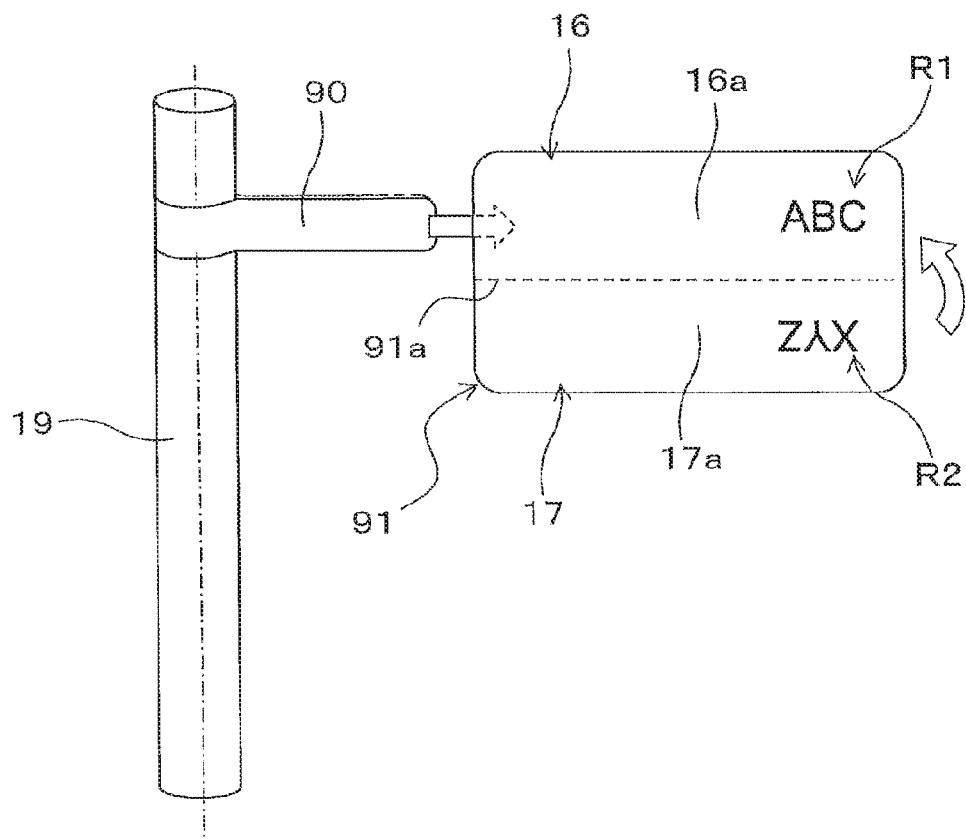
FIG. 7B is a view for description of using mode of the printing label as a P-type label.

When the label main body part 91 and winding part 90 are to be used, the printing label 200 illustrated in FIG. 7A is peeled off from the printing tape 50. Subsequently, as illustrated in FIG. 7B, the winding part 90 is wound around a cylindrical or cable-like adherend or object 19 (a cable in this example (hereinafter, simply referred to as "cable 19") having an axis extending in the up-down direction, such that a substantially center portion of the winding part 90 in the left-right direction is positioned at the cable 19 and is then the winding part 90 is folded (see the white arrow in FIG. 7A). Thereafter, the adhesive layer 52A at one end portion on the back surface of the winding part 90 is stuck to the adhesive layer 52A at another end portion on the back surface.

Then, the label main body part 91 is mountain-folded along the perforation line 91a positioned at the boundary between the first and second label areas 16 and 17, so as to stick the back surfaces (adhesive layer 52A) of the first and second label areas 16 and 17 to each other. At this time, the tip end portion (right end portion in the drawing) of the folded and stuck winding part 90 are inserted between one end portions (left end portions in the drawing) of the respective first and second label areas 16 and 17 in the longitudinal direction. As a result, the P-type label 92 is formed.

Thus, as illustrated in FIGS. 8A and 8B, the overlapped first and second label areas 16 and 17 protrude in the left-right direction from the winding part 90 stuck to the cable 19. That is, the entire shape including the cable 19 becomes a P-shape. FIG. 8A illustrates an outer appearance of the P-type label 92 stuck to the cable 19, as viewed from the front side (from the first label area 16 side). As illustrated, in the first label area 16, the character string "ABC" is printed on the first printing surface 16a as the printing R1 in the erected posture, with the character string being deviated toward an end portion (rear end of the character string "ABC") opposite to the winding part 90.

FIG. 8B illustrates an outer appearance of the P-type label 92 stuck to the cable 19 as viewed from the back side (second label area 17 side). As illustrated, in the second label area 17, the character string "XYZ" is printed on the second printing surface 17a as the printing R2 in the erected posture, with the character string being deviated toward an end portion (front end of the character string "XYZ") opposite to the winding part 90.

Figure 9A:
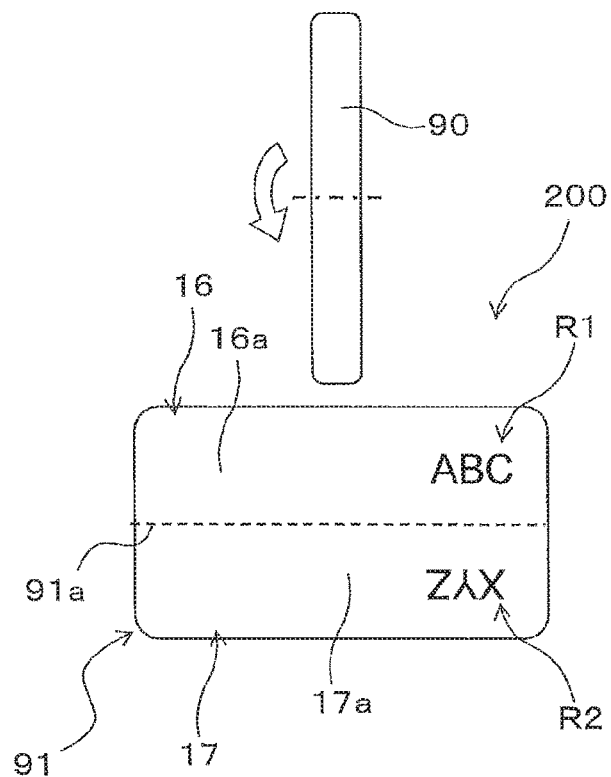
FIG. 9A is a plan view illustrating an outer appearance of a created printing label.
Figure 9B:
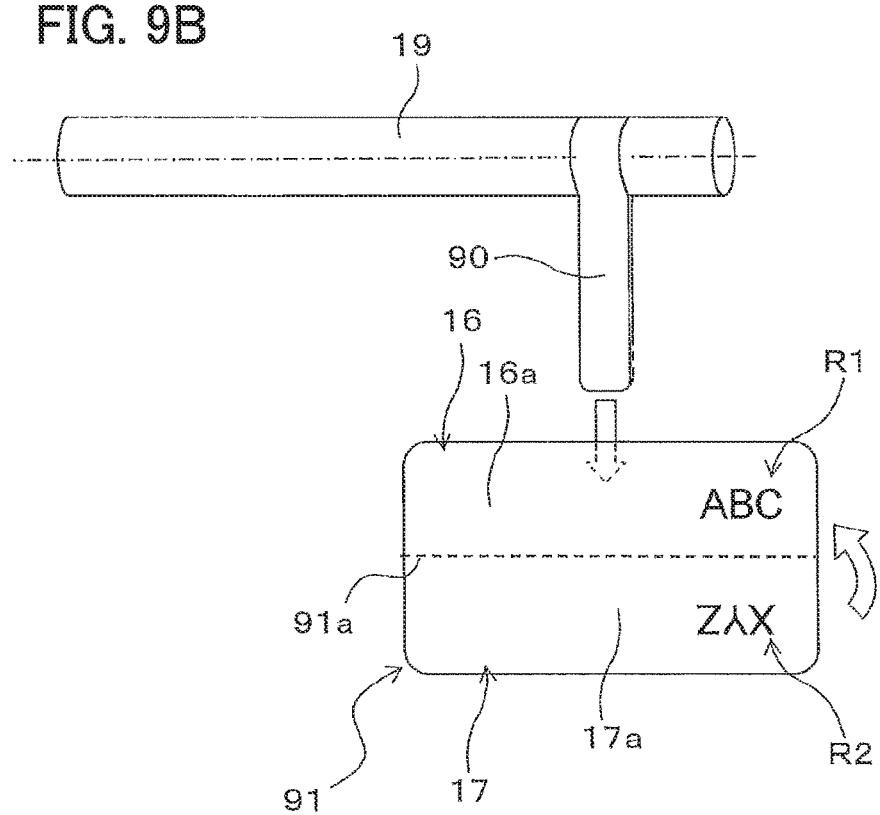
FIG. 9B is a view for description of using mode of the printing label as a T-type label.

Further, the above printing label 200 can be also used as a T-type label 93. FIGS. 9A to 10B are views illustrating a case where the winding part 90 and the label main body part 91 peeled off from the printing tape 50 is used as the T-type label 93. In the case of the P-type label 92, the folded and stuck end portions of the winding part 90 that is wound around the cable 19 are inserted between one end portions of the respective first and second label areas 16 and 17 in the longitudinal direction (see FIGS. 7A and 7B). On the other hand, in the case of the T-type label 93, as illustrated in FIGS. 9A and 9B, the folded and stuck end portions of the winding part 90 that is wound around the cable 19 are inserted between free end portions (edge portions on both the upper and lower sides) of the respective first and second label areas 16 and 17 at a center portion of the label areas in the longitudinal direction.

Figure 10A:
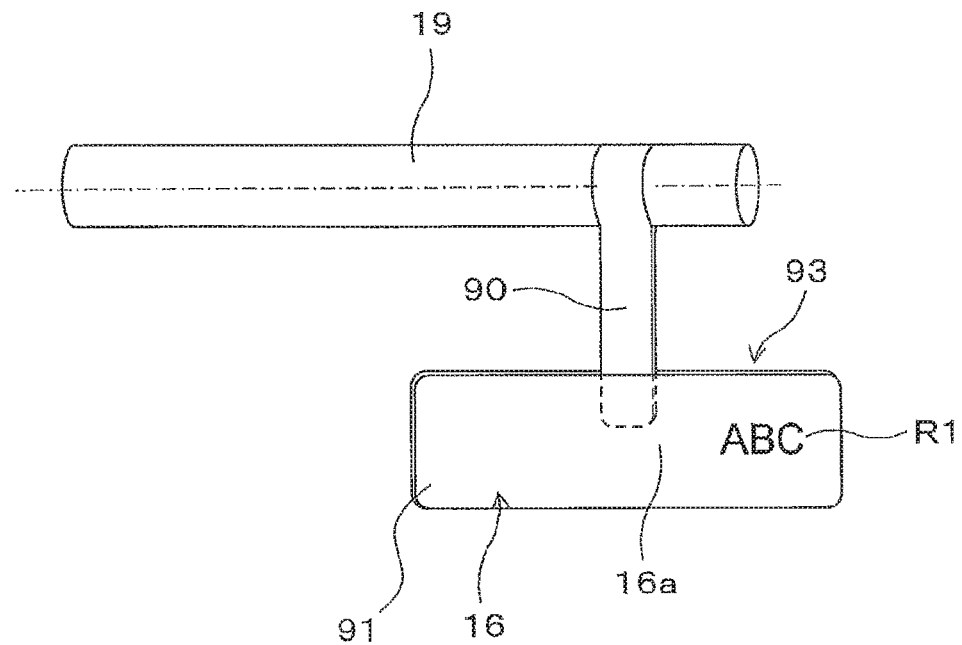
FIGS. 10A and 10B are views representing a using mode of the T-type label.
Figure 10B:
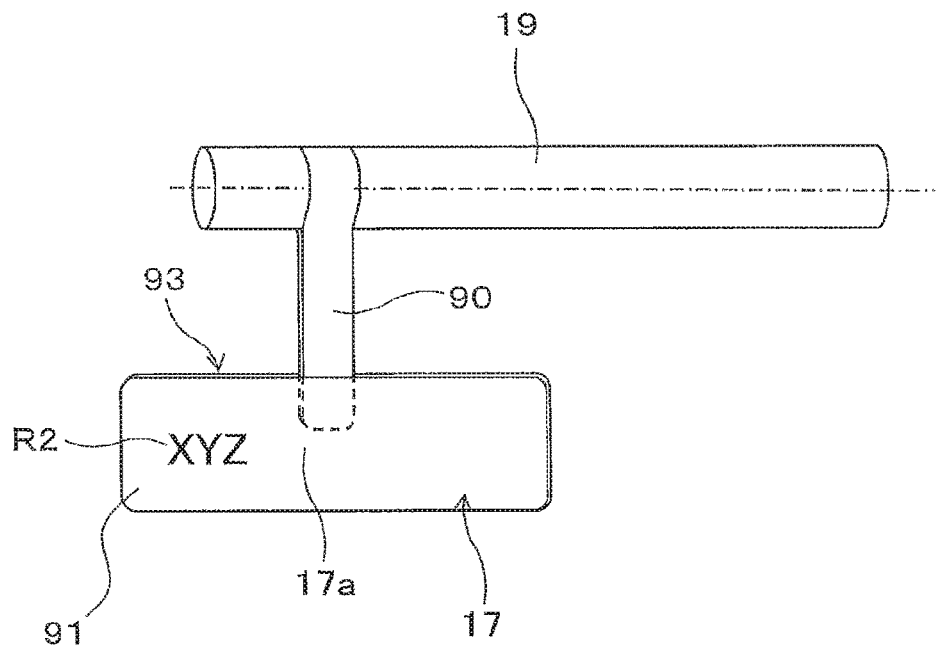

Thus, as illustrated in FIGS. 10A and 10B, the winding part 90 and label main body part 91 are used as the T-type label 93 in which the longitudinal direction of the overlapped first and second label areas 16 and 17 extends parallel to the longitudinal direction of the cable 19 in the attaching state of the label 93 to the cable 19. (That is, the winding part 90 and label main body part 91 form a T-shape).

In both cases of the P-type label 92 and T-type label 93, it is sufficient to prepare one winding part 90 in the above use mode. However, in the present embodiment, in order to make effective use of the width direction of the printing tape 50, two winding parts 90 including one spare winding part 90 are formed together with the label main body part 91 as one set.

Figure 12:
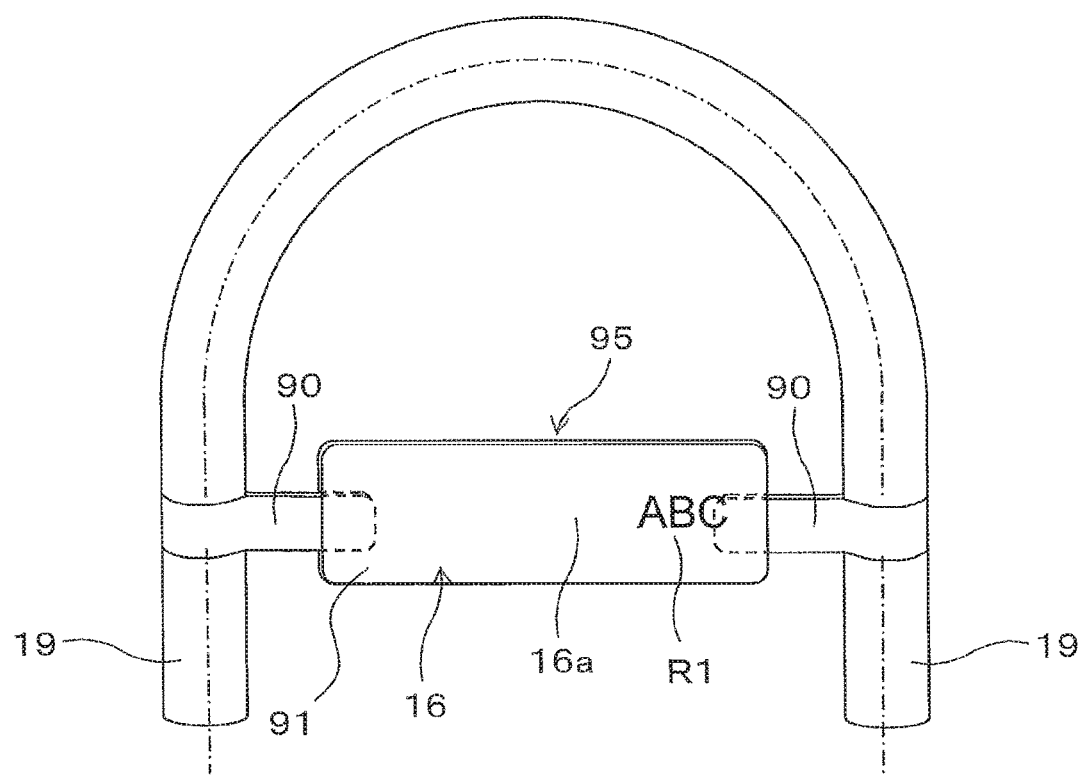
FIG. 12 is a view representing a using mode of a bridge-type label.

The one spare winding part 90 may be used for purposes other than as a spare. That is, by using both the two winding parts 90, a "π"-type label 94 as illustrated in FIG. 11 or a bridge-shaped label as illustrated in FIG. 12 can be realized. The π-type label 94 of FIG. 11 can be obtained by winding the two winding parts 90 around the cable 19 so as to create a space therebetween smaller than the length of the label main body part 91 in the left-right direction and then by inserting the tip end portions of the winding parts 90 between free end portions (edge portions on both the upper and lower sides) of the respective first and second label areas 16 and 17. The bridge-type label 97 of FIG. 12 can be obtained by winding the two winding parts 90 around the cable 19 bent at substantially 180° (or unillustrated two parallel cables) at two portions on the cable and then by inserting the tip end portion of each winding part 90 between longitudinal end portions (end portions on both the left and right sides) of the respective first and second label areas 16 and 17.

Effects of Embodiments

As described above, in the present embodiment, the label main body part 91 and the winding part 90 are formed separately from each other. Thus, the direction of the label main body part 91 can be freely changed with respect to the winding part 90 (see FIGS. 7A to 12). As a result, as compared to a case where the label main body part 91 and the winding part 90 are integrally formed, a degree of freedom when the label main body part 91 is attached to the cable 19 can be increased, thereby improving user's convenience. Further, the label main body part 91 and the winding part 90 are stuck to the release sheet 54 so as to be arrayed side by side to each other in the conveying direction (see FIG. 5A). Thus, the label main body part 91 can be formed widely in the widthwise direction of the tape, thereby ensuring a large printable area.

Particularly, in the present embodiment, the label main body part 91 has the perforation line 91a extending along the conveying direction and positioned at the center portion in the widthwise direction of the tape. The winding part 90 is formed separately from the label main body part 91, and is stuck to the release sheet 54 so as to be arrayed side by side to the label main body part 91 in the conveying direction. The winding part 90 has the length Wm in the widthwise direction of the tape equal to or less than the length Wh between the perforation lines 91a and the end of the label main body part 91 in the widthwise direction of the tape and the perforation line 91a. With this configuration, when the P-type label 92 or the like is created, a user can easily manually fold the label main body part 91 along the perforation lines 91a and easily stick the adhesive layers 52A on the back surfaces of the respective first and second label areas 16 and 17. Further, since the length Wm is set to be equal to or less than the length Wh, the both end portions of the winding part 90 that have been folded and stuck to each other can be positioned within the label main body part 91 when the end portions of the winding part 90 is inserted between the end portions of the respective first and second label areas 16 and 17 in the longitudinal direction. Accordingly, outer appearance of the created P-type label 92 (or the bridge-type label 97 can be improved.

Particularly, in the present embodiment, the downstream end (left end in FIG. 5A) of the label main body part 91 in the conveying direction and the upstream end (right end in FIG. 5A) of the winding part 90 in the conveying direction are spaced apart from each other on the release sheet 54. Thus, when one of the label main body part 91 and winding part 90 is peeled off first, erroneous simultaneous peeling off the remaining one of the label main body part 91 and the winding part 90 can be avoided.

Particularly, in the present embodiment, in the one set, the two winding parts 90, 90 are stuck to the release sheet 54 so as to be arranged side by side to each other in the widthwise direction of the tape (see FIG. 5A). Thus, when the P-type label 92 or T-type label 93 is created, one winding part 90 can be used as a spare for use in a case where the winding of the winding part 90 around the cable 19 fails. Further, by preparing two or more winding parts 90, various types of the label, such as the π-type label 94 and bridge-type label 97 can be realized.

Particularly, in the present embodiment, the two winding parts 90 in the one set are stuck to the release sheet 54 so as to be spaced apart from each other. That is, one end of the upper-side winding part 90 in the widthwise direction of the tape and the other end of the lower-side winding part 90 in the widthwise direction of the tape are spaced apart from each other. Thus, when one of the two winding parts 90 is peeled off first, erroneous simultaneous peeling off the remaining one of the winding parts can be prevented.

Particularly, in the present embodiment, the two winding parts 90 are stuck to the release sheet 54 so as to be symmetric with respect to the symmetric axis CL extending in the conveying direction and passing through the center of the printing tape 50 in the widthwise direction of the tape. Thus, pressing balance in the widthwise direction of the tape becomes satisfactory when the printing tape 50 is pressed and conveyed by the rollers in the printing device 1, thereby suppressing meandering of the printing tape.

Particularly, in the present embodiment, the label main body part 91 and the winding part 90 each have a rectangular shape. This allows the label main body part 91 and the winding part 90 to be easily peeled off from the release sheet 54.

Particularly, in the present embodiment, a plurality of sets each including one label main body part 91 and at least one winding part 90 as one set are stuck to the release sheet 54 in the same posture in the conveying direction. Thus, meandering of the printing tape 50 during conveyance in the printing device 1 can be suppressed, and a plurality of the P-type labels 92 can be created from one printing tape 50 under the same condition.

Particularly, in the present embodiment, the adhesive sheet 52 divided into the label main body part 91, winding part 90, and non-label part 96 by the cut lines 55 is stuck to the upper surface of the release sheet 54. Thus, even when the label main body part 91 and the winding part 90 are formed in various sizes and shapes irrespective of the length of the printing tape 50 in the widthwise direction of the tape, the thickness of the adhesive sheet 52 is uniform over the entire printing tape 50, thereby suppressing distortion of the printing tape roll 51 and meandering of the printing tape 50 during conveyance in the printing device 1.

The present disclosure is not limited to the above-described embodiment, but may be variously modified without departing from the spirit and scope of the disclosure. Hereinafter, various modifications will be described.

(1) Variation of Arrangement of Label Main Body Part and Winding Part

Figure 13:
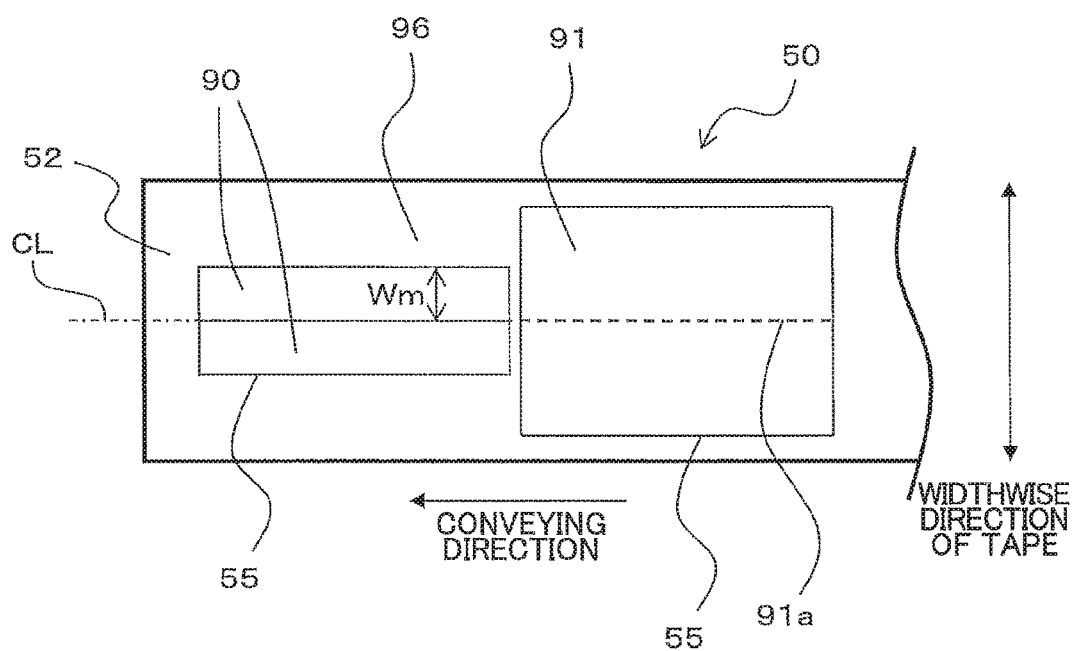
FIG. 13 is a plan view of a printing tape including two winding parts positioned close to each other in the width-wise direction of the tape according to a modification.

In the above-described embodiment, the two winding parts 90, 90 in the one set are disposed apart from each other in the widthwise direction of the tape. Alternatively, two winding parts may be disposed so as to contact each other in the widthwise direction of the tape as illustrated in FIG. 13. In the latter case, in the two winding parts 90, 90 juxtaposed in the widthwise direction of the tape and stuck on the release sheet 54, another end (upper end) in the widthwise direction of one winding part 90 (lower winding part) is in contact with one end (lower end) in the widthwise direction of another winding part 90 (upper winding part).

Figure 14:
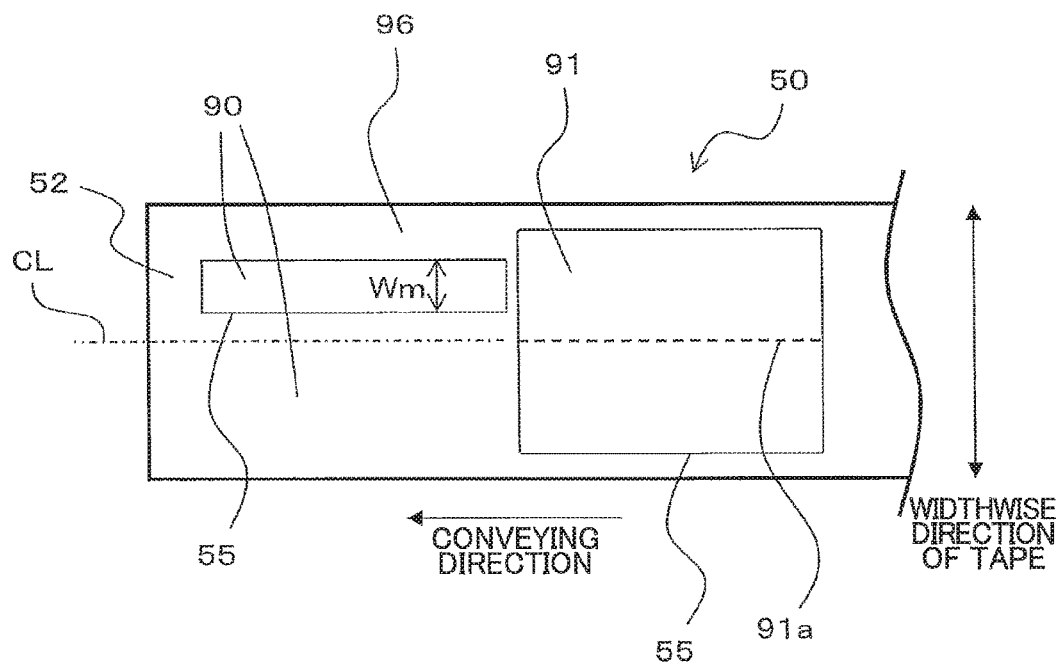
FIG. 14 is a plan view of a printing tape including a single winding part according to a modification.
Figure 15:
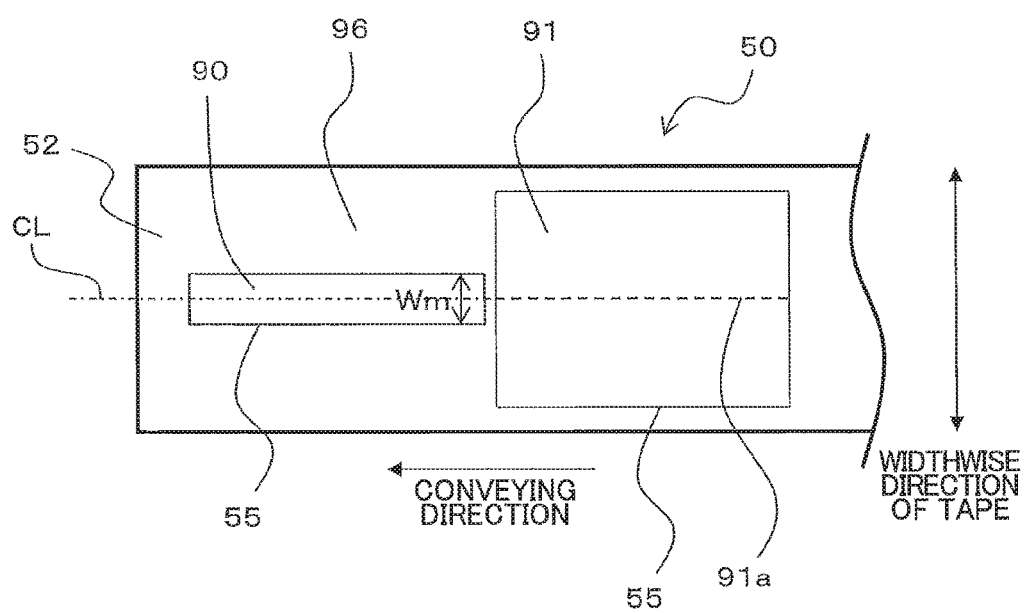
FIG. 15 is a plan view of a printing tape including a single winding part positioned at a widthwise center portion of the tape according to a modification.

Further, as illustrated in FIG. 14, only one winding part 90 may be provided. In this case, as illustrated in FIG. 15, the one winding tape 90 is disposed symmetric with respect to the symmetric axis CL equally dividing the upper and lower parts of the winding part 90 in the widthwise direction of the tape of the printing tape 50. That is, one winding part 90 is stuck to the center portion of the release sheet 54 in the widthwise direction of the tape. Thus, meandering of the printing tape 50 during conveyance in the printing device 1 can be suppressed.

Figure 16:
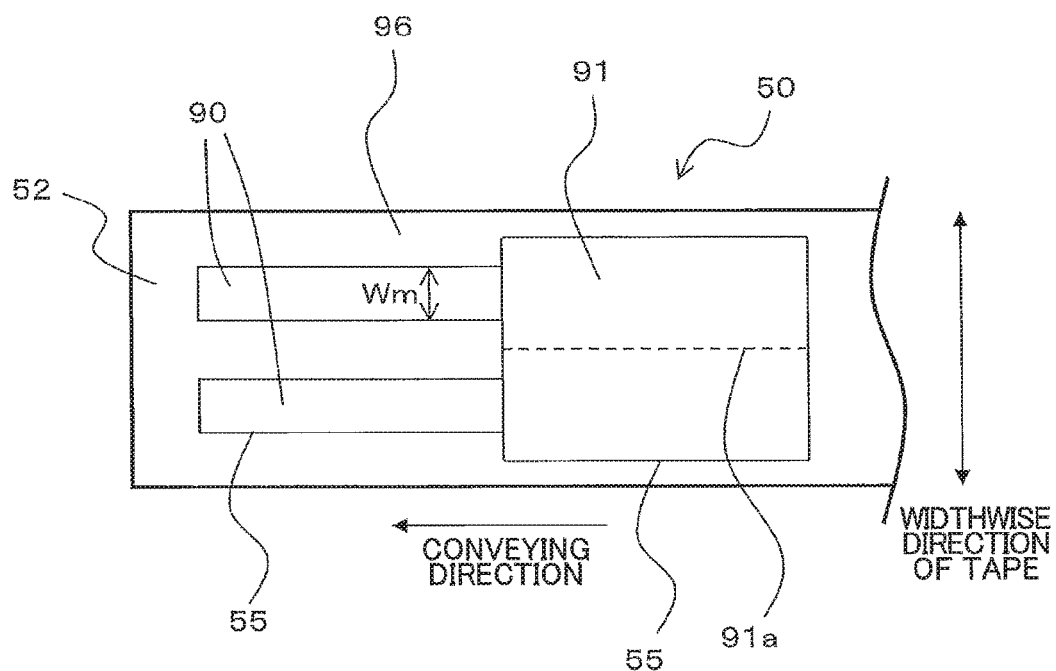
FIG. 16 is a plan view of a printing tape including winding parts and a label main body part positioned close to each other in a conveying direction according to a modification.

(2) Modification where Winding Part and Label Main Body Part are not Separated from Each Other In the above-described embodiment, the winding part 90 and the label main body part 91 are separated from each other in the conveying direction. Alternatively, these may be disposed so as to contact each other in the conveying direction as illustrated in FIG. 16. That is, a downstream end (left end in the drawing) of the label main body part 91 in the conveying direction and an upstream end (right end in the drawing) of each winding part 90 in the conveying direction contact each other on the release sheet 54. Thus, a part of the adhesive sheet 52 that is to be discarded wastefully as the non-label part 96 can be reduced.

Figure 17:
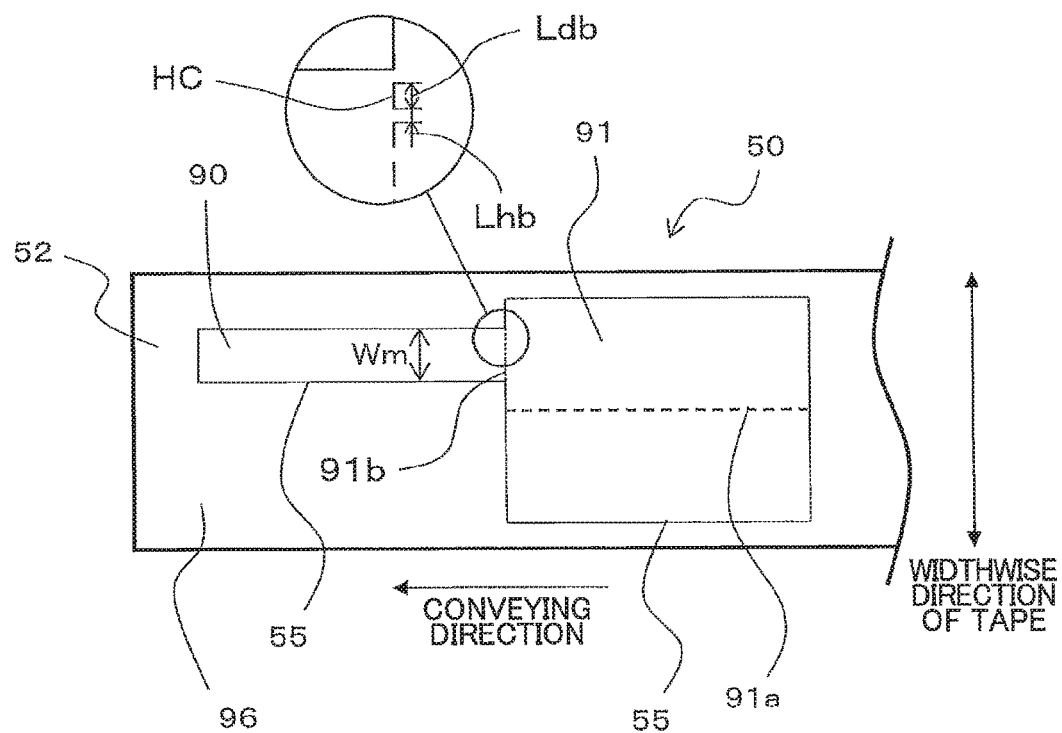
FIG. 17 is a plan view of a printing tape including a winding part and a label main body part connected to the winding part by a perforation line according to a modification.

Further, as illustrated in FIG. 17, the winding part 90 and the label main body part 91 may be connected through a perforation line 91b. As illustrated in the partially enlarged view of FIG. 17, as the perforation line 91b, half-cut lines HC each having a length Ldb are formed intermittently at an interval of Lhb by the half-cut treatment. In this example, the length Ldb is greater than the interval Lhb. This allows the winding part 90 to be easily cut off from the label main body part 91 along the perforation line 91b. Alternatively, as illustrated in FIG. 18, the winding part 90 and the label main body part 91 may be connected through a sufficiently thin neck part 56.

Figure 18:
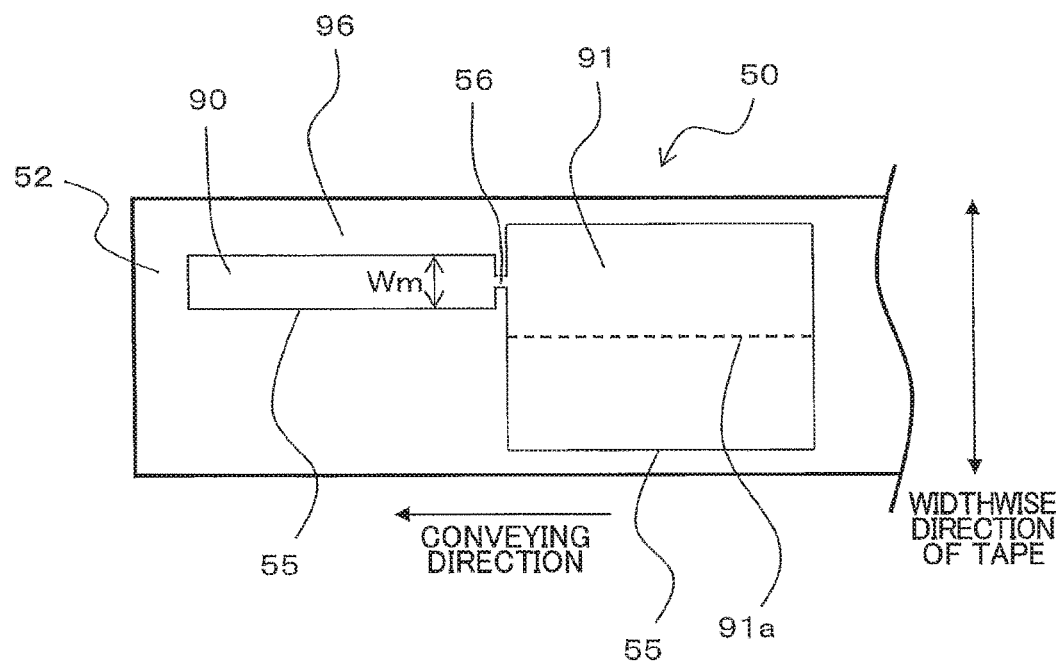
FIG. 18 is a plan view of a printing tape including a winding part and a label main body part connected to the winding part by a neck part according to a modification.

In either case illustrated in FIGS. 17 and 18, the winding part 90 and the label main body part 91 are integrally connected through a portion (in the case of FIG. 17, a plurality of parts each having the length (interval) Lhb) thinner than the length Wm of the winding part 90 in the widthwise direction of the tape. At the time of use, the winding part 90 and the label main body part 91 can be easily separated from each other by cutting the thin part. Thus, as in the above-described embodiment, the direction of the label main body part 91 with respect to the winding part 90 can be freely changed. As a result, as compared to the case where the label main body part 91 and the winding part 90 are integrally formed, the degree of freedom when the label main body part 91 is attached to the cable 19 can be increased, thereby improving user's convenience.

(3) Modification where Perforation Line Extends in Widthwise Direction of the Tape In the above-described embodiment, the perforation line 91a is formed along the conveying direction at the center of the label main body part 91 in the widthwise direction of the tape. Alternatively, as illustrated in FIG. 19, a perforation line 91a may be formed in the widthwise direction of the tape at the center of the label main body part 91 in the conveying direction. In this case, the length of the perforation line 91a is made comparatively short, making it easier to fold the label main body part 91. Further, although not especially illustrated, the direction and position of the perforation line 91a may be optionally determined.

In place of the perforation line 91a (extending in the conveying direction or widthwise direction of the tape), a folding line may be printed at the same position. In this case, the direction and position of the folding line may be determined according to user's preference.

(4) Modification where Mark Line is Formed in Winding Part

Figure 21A:
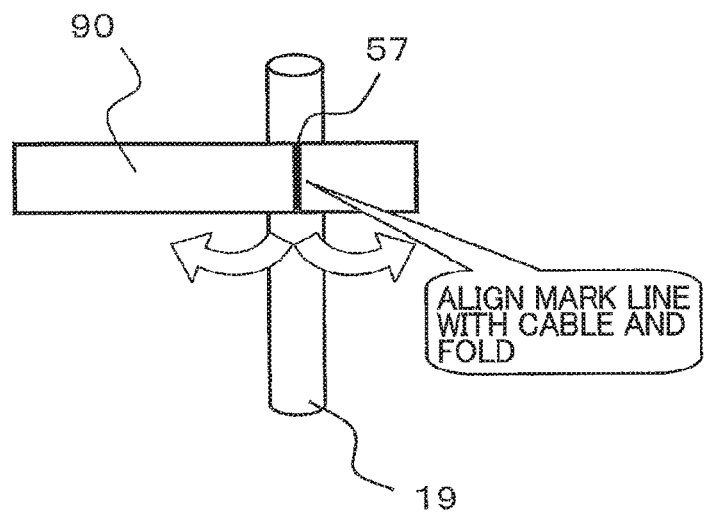
FIGS. 21A and 21B are views for description of using mode of the winding part formed with the mark line according to the modification of FIG. 20.
Figure 21B:
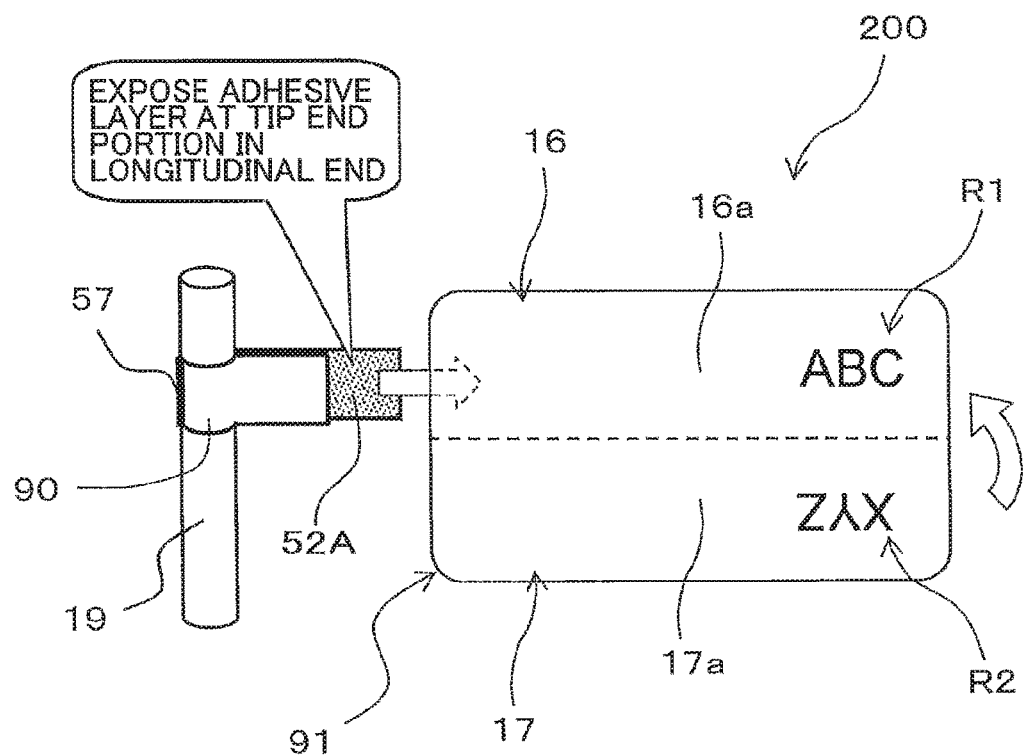

As illustrated in FIG. 20, a winding mark may be formed in the winding part 90. Particularly, in the illustrated example, a mark line 57 extending in the widthwise direction of the tape is printed on a part other than the center (see one dotted chain line) of the winding part 90 in the conveying direction. By forming the mark line 57 at a position decentered in the conveying direction, the following effect can be obtained. That is, as illustrated in FIG. 21A when the winding part 90 is folded and wound around the cable 19 with mark line 57 being aligned with the cable, end portions of the winding part 90 are stuck to each other such that each distal end of the winding part 90 is displaced from each other as illustrated in FIG. 21B. As a result, the adhesive layer 52A is exposed to an atmosphere at one end portion. In this state, when the end portion of the wound winding part 90 is inserted between the first and second label areas 16 and 17 of the label main body part 91, the adhesive layer 52A exposed at the end portion of the winding part 90 contacts the adhesive layer 52A of the label main body part 91, and the adhesive layers are firmly stuck to each other. This further strengthens the connection between the winding part 90 and the label main body part 91 in comparison with the connection in the above-described embodiment.

(5) Modification where Constriction Part is Formed

Figure 22:
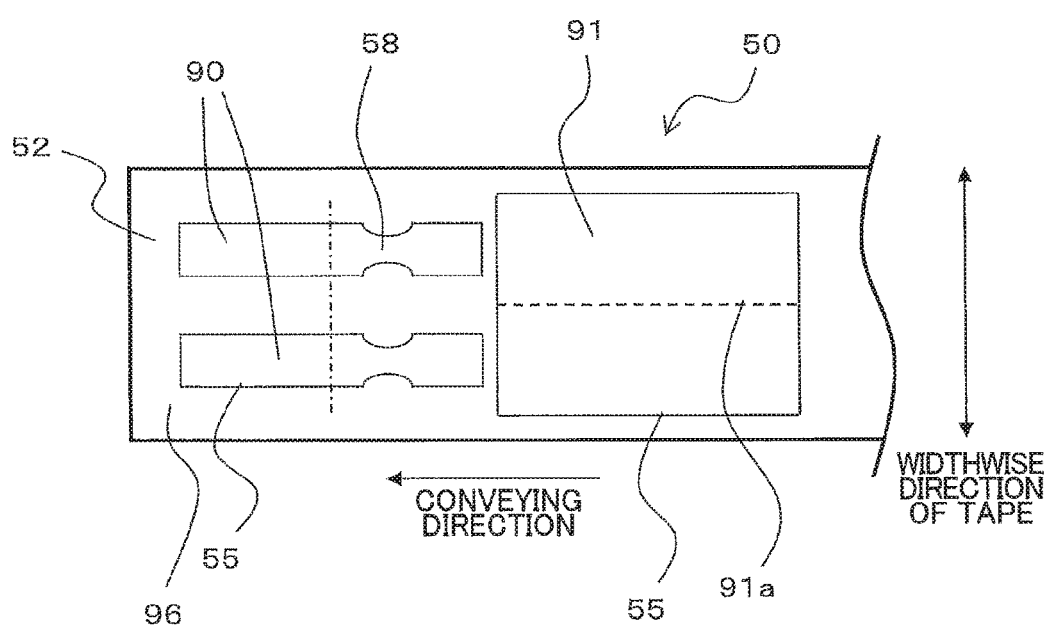
FIG. 22 is a plan view of a printing tape including a winding part in which a constriction part is provided at a deviated position in the conveying direction according to a modification.

In the winding part 90, the same function as that of the mark line 57 can be realized by a constriction part 58 as illustrated in FIG. 22. The constriction part 58 is a part obtained by locally reducing the length of the winding part 90 in the widthwise direction of the tape in a curved manner. Also in this case, firm sticking between the winding part 90 and the label main body part 91 can be achieved by the exposed adhesive layer 52A similar to the above-described modification (4).

Figure 23:
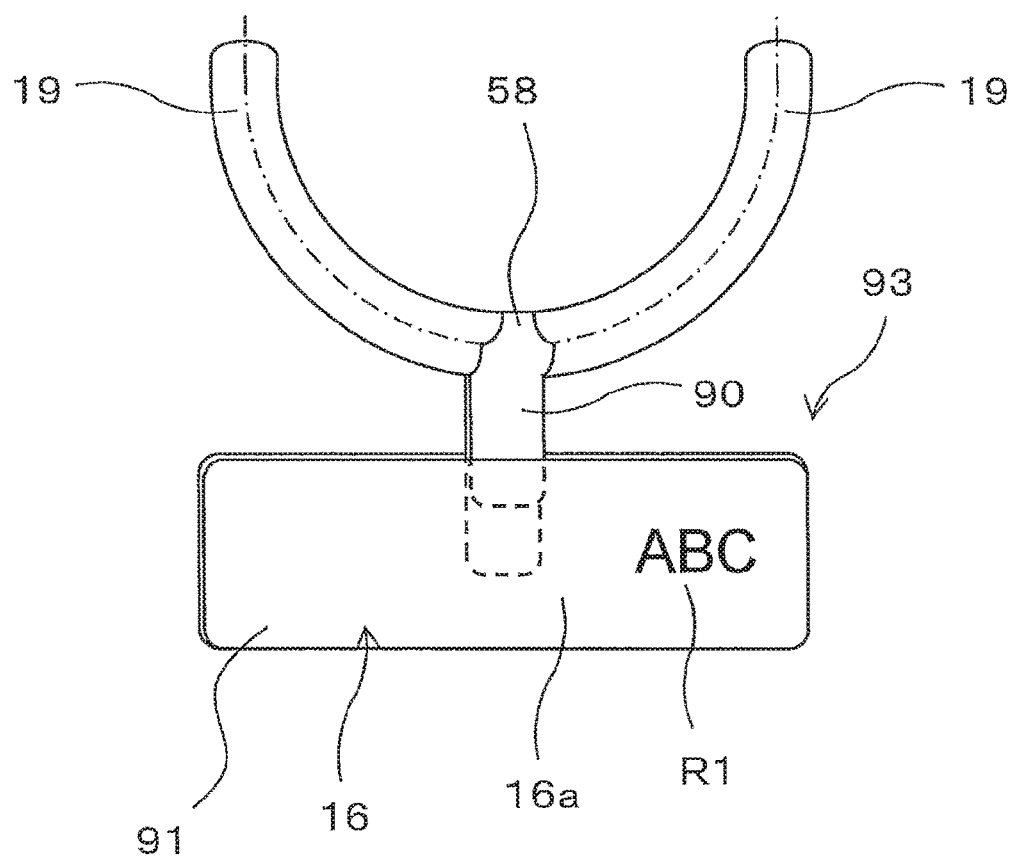
FIG. 23 is a view for description of using mode of the winding part including a constriction part according to the modification of FIG. 22.

In a case where the winding part having such constriction part 58 is used, as illustrated in FIG. 23, the winding part 90 is wound around the cable 19 such that the narrow part whose length in the widthwise direction of the tape is smaller than the remaining part is positioned at an inner curved side whose radius of curvature is particularly small. With this winding, floating of the winding part as a result of the sticking can be suppressed, and thus the firm sticking can be achieved with a natural appearance.

(6) Modification where Protruding Part is Provided

Figure 24:
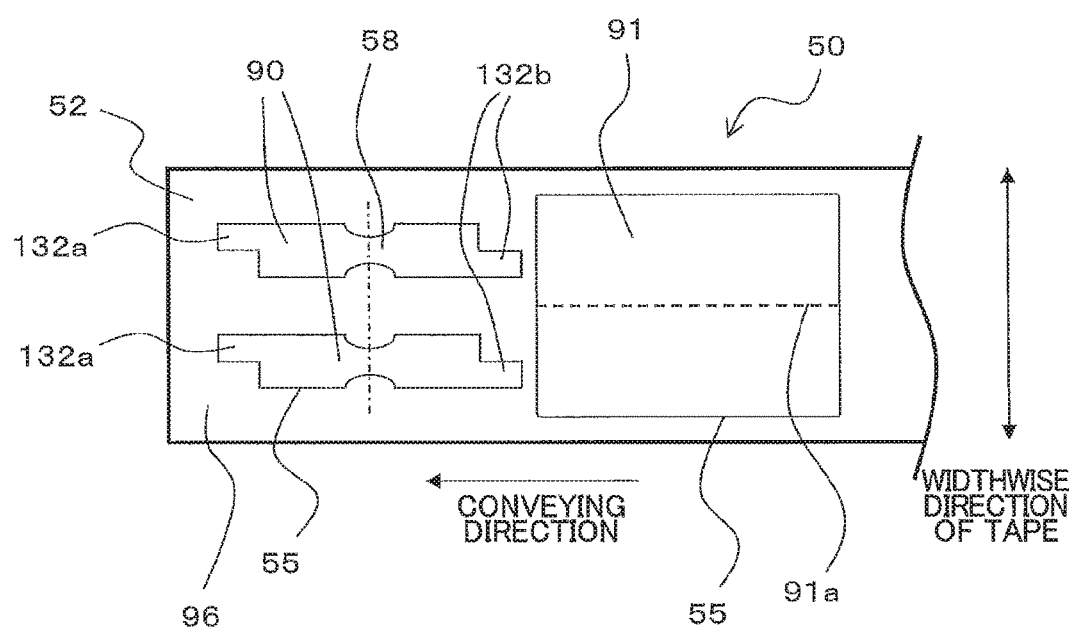
FIG. 24 is a plan view of a printing tape including a winding part in which each end portion is provided with a protruding part according to a modification.

As illustrated in FIG. 24, protruding parts 132a and 132b protruding in the downstream direction and upstream direction in the conveying direction may be provided at each end of the winding parts 90 in the conveying direction. The protruding parts 132a, 132b are positioned at different positions in widthwise direction of the tape. That is, in this case, the widthwise position of the protruding part 132a (corresponding to one endmost portion) provided at most downstream end (left end) in the conveying direction is different from the widthwise position of the protruding part 132b (corresponding to another endmost portion) provided at most upstream end (right end) in the conveying direction. The lengths of the two protruding parts 132a and 132b in the widthwise direction of the tape are substantially equal to each other.

Figure 25:
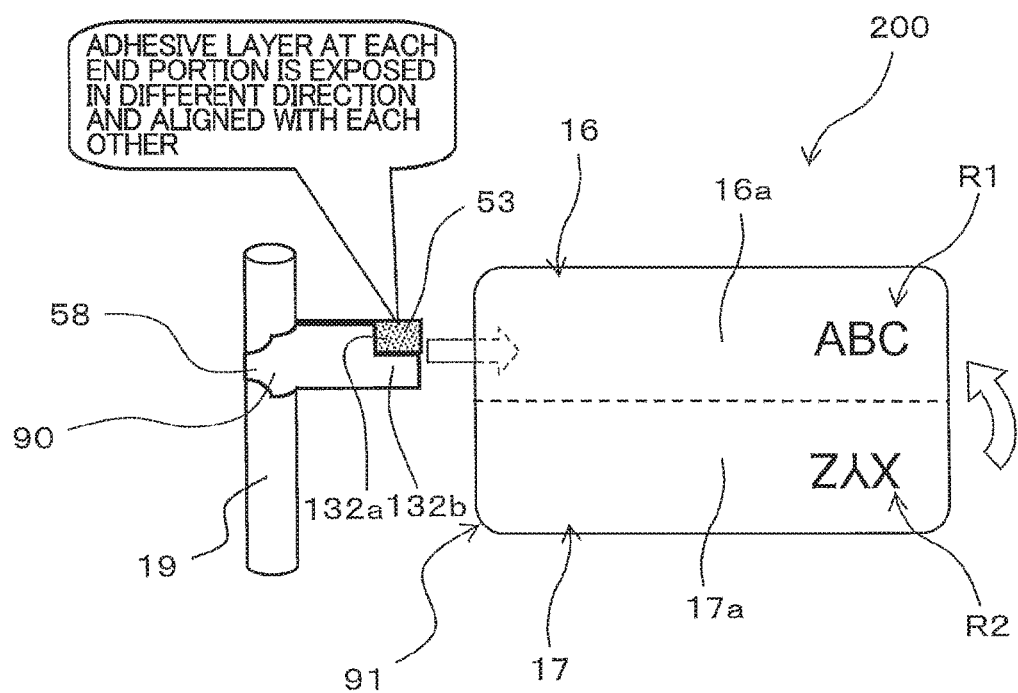
FIG. 25 is a view for description of using mode of the winding part including the protruding parts according to the modification of FIG. 24.

By providing the protruding parts 132 at the both end portions of the winding part 90 that are different in position in the widthwise direction, the following effect can be obtained. That is, as illustrated in FIG. 25, when the winding tape 90 is wound around the cable 19 (with the constriction part 58 being aligned with the cable in this example) at the time of use, the adhesive layers 52A of the two protruding parts 132a and 132b at the respective end portions of the winding part are arrayed side by side in the widthwise direction and are exposed to the atmosphere in a direction opposite to each other. In this state, when the end portions of the winding part 90 are inserted between the first and second label areas 16 and 17 of the label main body part 91, the two adhesive layers 52A exposed at the end portions of the winding part 90 contact the adhesive layer 52A of the label main body part 91, so that the adhesive layers are firmly stuck to each other. As a result, the winding part 90 and the label main body part 91 can be connected more firmly to each other than in the case of the modification (4).

In this case, both ends of the winding part 90 in the conveying direction need to be aligned with each other. Therefore, when any mark (constriction part 58 in this example) is to be provided, the mark should be located at the center of the winding part 90 in the longitudinal direction.

In the above example, the positions of the two protruding parts 132a and 132b in the widthwise direction of the tape are made different from each other, while the lengths of the protruding parts in the widthwise direction of the tape are made substantially equal to each other. Alternatively, the positions of the two protruding parts 132a and 132b in the widthwise direction of the tape may be substantially equal to each other while the lengths of the tow protruding parts in the widthwise direction of the tape may be made different from each other. That is, in this case, the length in the widthwise direction of the tape of the protruding part 132a (corresponding to one endmost portion) positioned at a most downstream end in the conveying direction and the length in the widthwise direction of the tape of the protruding part 132b (corresponding to another endmost portion) positioned at a most upstream end in the conveying direction differ from each other. Also, in this case, the adhesive layer 52A of at least one of the two protruding parts 132a and 132b contacts the adhesive layer 52A of the label main body part 91 to be firmly stuck to each other, whereby the winding part 90 and the label main body part 91 can be firmly connected.

(7) Structure Having No Label Part

Figure 26:
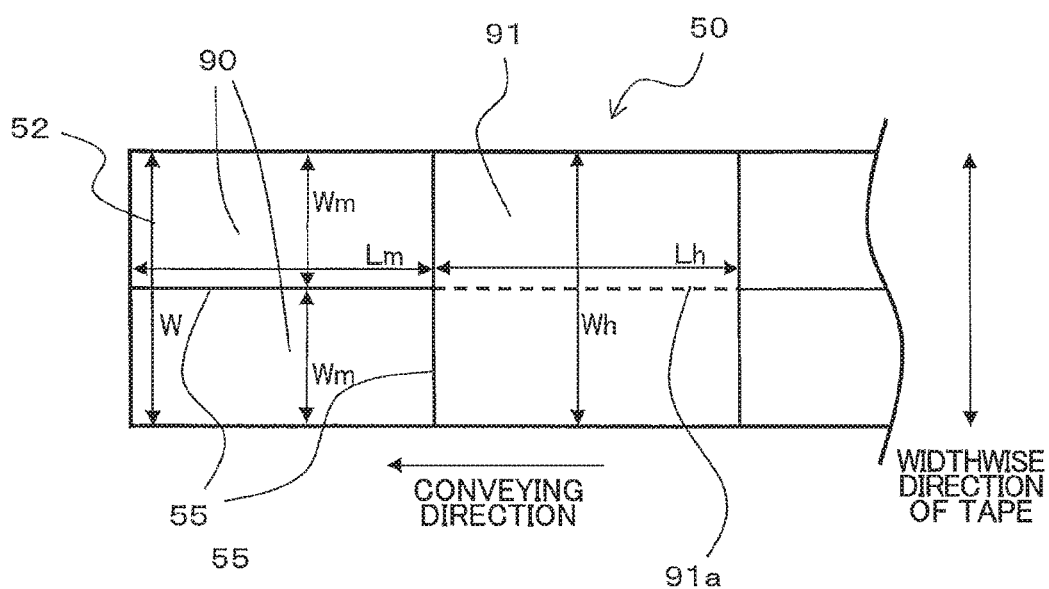
FIG. 26 is a plan view of a printing tape including a winding part elongated in the conveying direction and a label main body part arrayed with the winding part in the conveying direction according to a modification where a non-label part is not provided.
Figure 27:
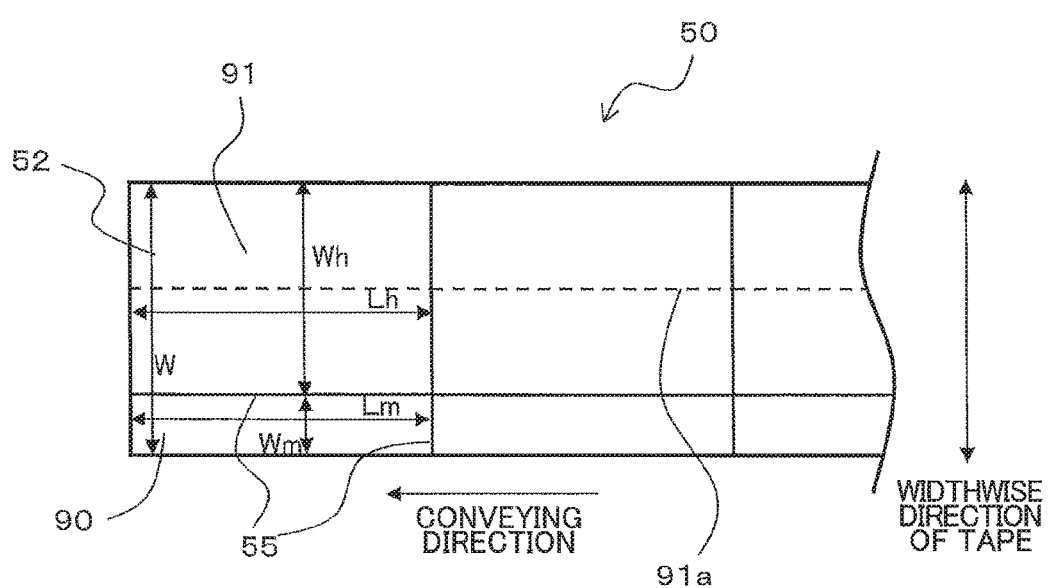
FIG. 27 is a plan view of a printing tape including a winding part and a label main body part arrayed with the winding part in the widthwise direction of the tape according to a modification where a non-label part is not provided.
Figure 28:
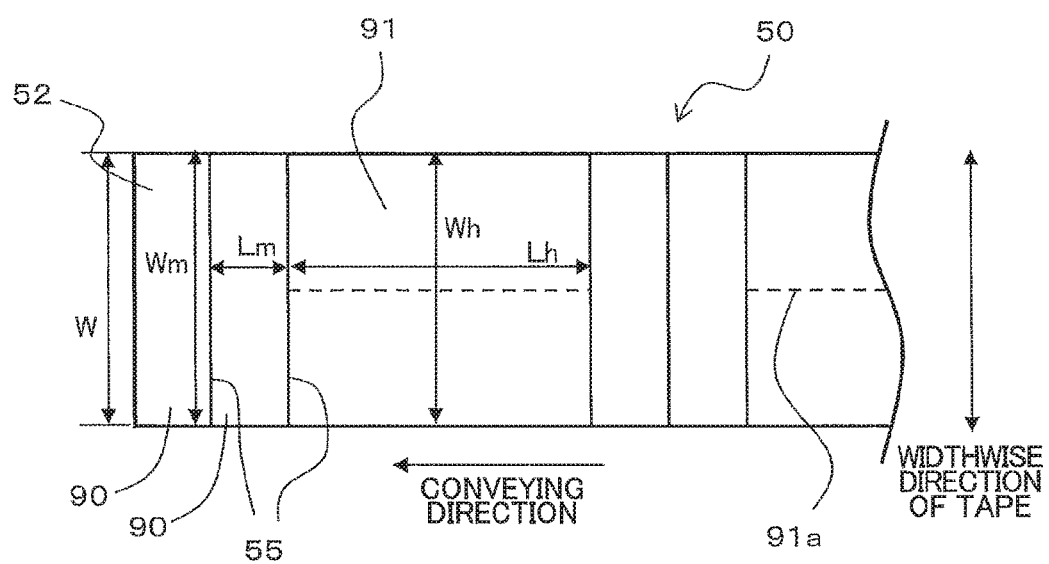
FIG. 28 is a plan view of a printing tape including a winding part elongated in the widthwise direction of the tape and a label main body part arrayed with the winding part in the conveying direction of the tape according to a modification where a non-label part is not provided.

In the above-described examples, the adhesive sheet 52 includes both the label part 95 and the non-label part 96. Alternatively, the adhesive sheet 52 may only include the label part 95 without having the non-label part 96. For example, as illustrated in FIGS. 26 to 28, an entire area of the adhesive sheet 52 covering the release sheet 54 may be exclusively allocated to the winding part 90 and label main body part 91. That is, the adhesive sheet 52 having the same shape as the release sheet 54 and including the label main body parts 91 and the winding parts 90 separated from each other by the cut lines 55 is stuck to the upper surface of the release sheet 54.

For example, in the printing tape 50 illustrated in FIG. 26, in the one set, two winding parts 90, 90 each having a length Wm in the widthwise direction of the tape which is half of the length W of the printing tape 50 in the widthwise direction of the tape are arrayed side by side in the widthwise direction of the tape, and one label main body part 91 having a length Wh in the widthwise direction of the tape which is equal to the length W of the printing tape 50 in the widthwise direction of the tape is disposed upstream of the winding parts 90, 90 in the conveying direction. In this example, a length Lm of each winding part 90 in the conveying direction is substantially equal to a length Lh of the label main body part 91 in the conveying direction.

Also in this case, the length Wm of each winding part 90 in the widthwise direction of the tape is less than the length Wh of the label main body part 91 in the widthwise direction of the tape, so that appearance of the created P-type label 92 (or bridge-type label 97) can be improved.

Further, in the printing tape 50 illustrated in FIG. 27, in the one set, one label main body part 91 having a length Lh in the conveying direction and one winding part 90 having a length Lm in the conveying direction (Lm=Lh) are arrayed side by side in the widthwise direction of the tape. That is, the winding part 90 is formed separately from the label main body part 91 and stuck to the release sheet 54 so as to be arrayed side by side to the label main body part 91 in the widthwise direction of the tape. In this case, the sum of the length Wh of one label main body part 91 in the widthwise direction of the tape and the length Wm of one winding part 90 in the widthwise direction of the tape is equal to the length W of the printing tape 50 in the widthwise direction of the tape.

This can reduce the length of the one set in the conveying direction, which can increase the number of sets of the winding tape 90 and label main body part 91 to be formed in the printing tape 50. Although not especially illustrated, two winding parts 90, 90 may be arrayed side by side on one side (lower side in the drawing) or the other side (upper side in the drawing) of one label main body part 91 in the widthwise direction of the tape.

Further, in the printing tape 50 illustrated in FIG. 28, in the one set, two winding parts 90 elongated in the widthwise direction of the tape (length Wm of the winding part in the widthwise direction of the tape is equal to the length W of the printing tape 50 in the widthwise direction of the tape) are arrayed side by side in the conveying direction, and one label main body part 91 having a length Wh in the widthwise direction of the tape equal to the length W of the printing tape 50 is disposed upstream of the winding parts 90 in the conveying direction. That is, the winding parts 90 are formed separately from the label main body part 91, and the winding parts have length in the widthwise direction of the tape greater than a length in the conveying direction. In this example, the length Lm of each winding part 90 in the conveying direction is smaller than the length Lh of the label main body part 91 in the conveying direction.

Also in this case, a length required in the conveying direction per one set can be reduced to thereby increase the number of sets in the printing tape 50. Although not especially illustrated, the one set may include only one winding part 90.

In the modifications illustrated in any of FIGS. 26 to 28, a part of the adhesive sheet 52 that is to be discarded as the non-label part 96 does not exist. Therefore, the adhesive sheet 52 can be used most efficiently. In this case, it is sufficient that the cut line 55 is previously formed by the half-cut treatment at least on the boundary between the label main body part 91 and the winding part 90 in the one set, and the boundary between the adjacent two sets may be cut by the cutter of the printing device 1.

(8) Shape Other than Rectangle

Figure 29:
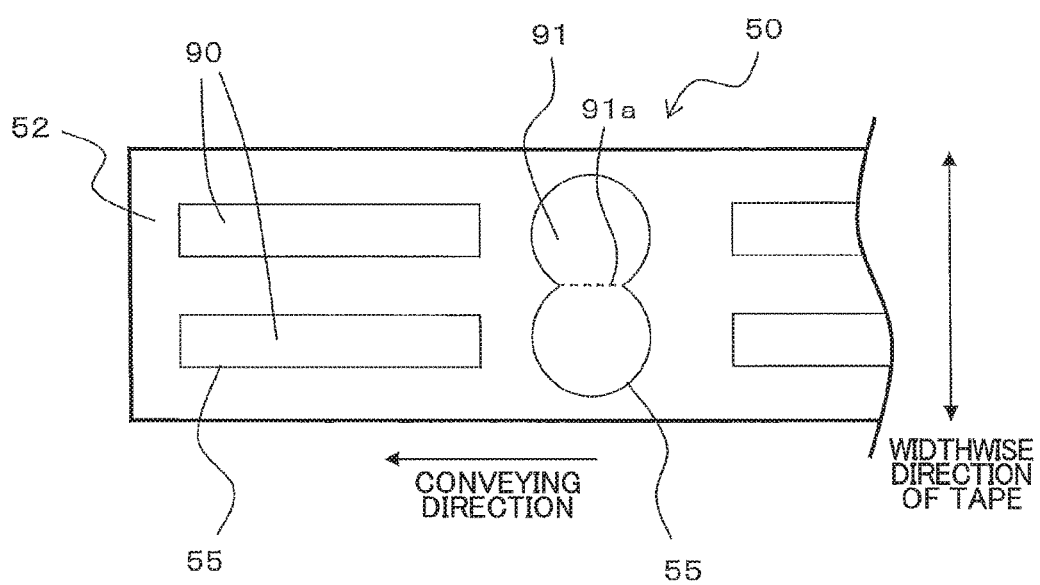
FIG. 29 is a plan view of a printing tape including a label main body part in a form of a digit "8" according to a modification.

In the above examples, the label main body part 91 is formed into a rectangular shape. Alternatively, as illustrated in FIG. 29, the label main body part 91 may include two substantially circular shaped first and second label areas 16 and 17 (a figure of eight, as a whole) with the perforation line 91a at a boundary between the first and second label areas. Although not especially illustrated, the first and second label areas 16 and 17 may each be formed into any shape, including polygonal shapes, as long as they are in a mirror-image relationship.

(9) Structure in which Non-Label Part is Removed in Advance

Figure 30:
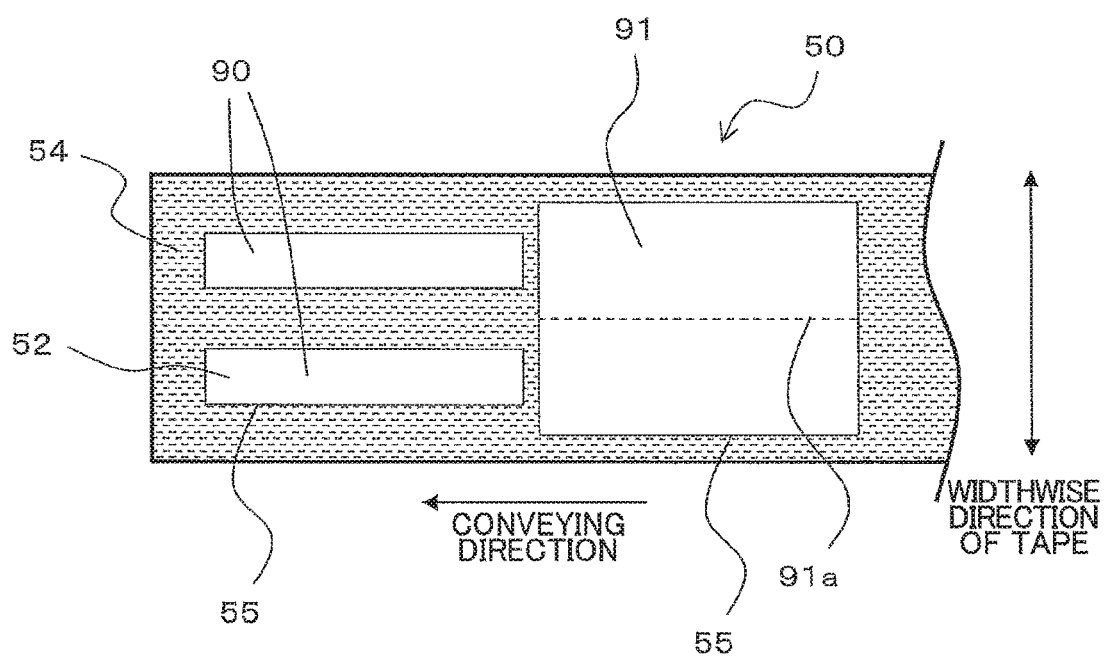
FIG. 30 is a plan view of a printing tape where a non-label part is removed in advance according to a modification.

In the above examples, the adhesive sheet 52 including the label part 95 and non-label part 96 is stuck to the release sheet 54 so as to cover the entire release sheet 54, or the adhesive sheet 52 only including the label part 95 is stuck to the release sheet 54 so as to cover the entire release sheet 54. Alternatively, as illustrated in FIG. 30, a printing tape 50 in which the non-label part 96 is previously removed (peeled off) from the adhesive sheet 52 may be used. In this case, a part of the release sheet 54 other than the part covered by the label part 95 (label main body part 91 and winding part 90) is exposed (the exposed portion is illustrated by a broken line hatching in the drawing).

In this case, the printing tape 50 does not include the non-label part 96, so that the weight of the printing tape roll 51 and hence the tape cartridge 100 can be reduced.

(10) Structure in which Non-Label Part is Removed in Advance

Figure 31:
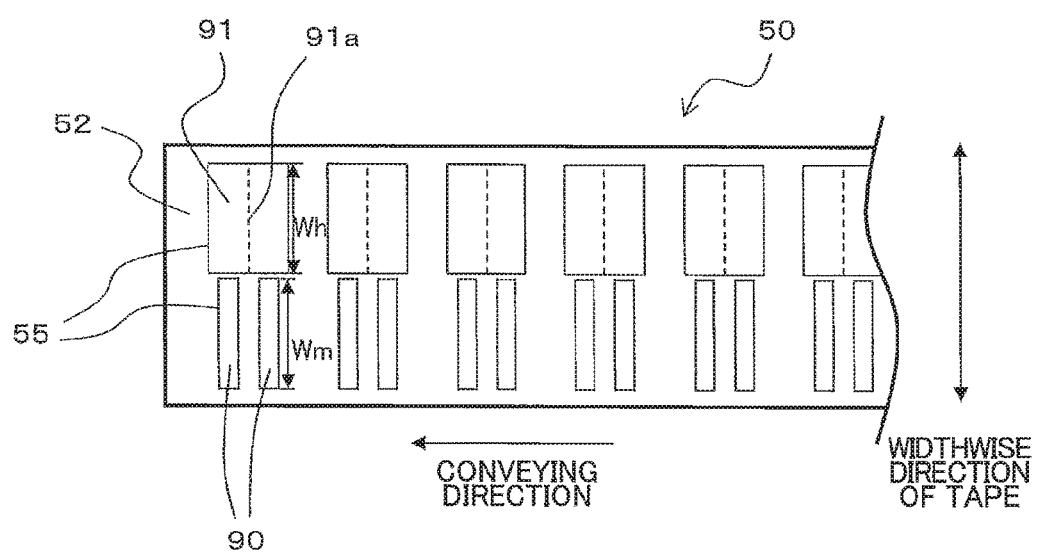
FIG. 31 is a plan view of a printing tape including a winding part elongated in the widthwise direction of the tape and a label main body part elongated in the widthwise direction of the tape and arrayed with the winding part in the widthwise direction of the tape according to a modification.

In a case where a length W of a printing tape 50 in the widthwise direction of the tape is comparatively large as illustrated in FIG. 31, one or more winding parts 90 (two winding parts in this example) each having a rectangular shape elongated in the widthwise direction of the tape (having a length Wm in the widthwise direction of the tape) and one label main body part 91 having a rectangular shape and elongated in the widthwise direction of the tape (having a length Wh in the widthwise direction of the tape) may be arrayed side by side in the widthwise direction of the tape. Also in this case, a required length in the conveying direction per one set can be reduced to thereby increase the number of sets in the printing tape 50.

[Others]

In the description, the terms "vertical", "parallel", or "plane" are not used in a strict sense. That is, the terms "vertical", "parallel", and "plane" also imply "substantially vertical", "substantially parallel", and "substantially plane", respectively, where design/manufacturing tolerance and error are allowed.

Further, in the above description, the terms "same", "equal", or "different" concerning the outer appearance or size are not used in a strict sense. That is, the terms "same", "equal", and "different" also imply "substantially same", "substantially equal", or "substantially different", respectively, where design/manufacturing tolerance and error are allowed.

However, the terms "same", "equal", or "different" concerning a value used as a predetermined determination criterion such as a threshold value or a reference value are used in a strict sense unlike the above.

In the above description, the arrows in FIG. 4 represent an example of the flow of a signal and do not limit the flowing direction of the signal.

Further, any techniques described in the embodiment and modifications may be properly combined together other than the described matter.

According to the present disclosure, the following aspects may be conceivable.

According to one aspect of the disclosure, there is provided a tape including a release sheet, a main label portion, and a subordinate label portion. The release sheet has an elongated rectangular shape. The release sheet has a length in a first direction greater than a length in a second direction perpendicular to the first direction. The main label portion has a rectangular shape including a first short side and a first long side. The main label portion is affixed to the release sheet with directing the first long side in one of the first direction and the second direction. The subordinate label portion has a rectangular shape including a second short side shorter than the first short side and a second long side. The subordinate label portion is separate from the main label portion or is integrally connected to the main label portion through a portion having a width smaller than that of the subordinate label portion. The subordinate label portion is affixed to the release sheet in one of the following manners: (i) the second long side extends in the first direction, and the subordinate label portion is arrayed with the main label portion in the first direction; (ii) the second long side extends in the first direction, and the subordinate label portion is arrayed with the main label portion in the second direction; and (iii) the second long side extends in the second direction, and the subordinate label portion is arrayed with the main label portion in the first direction.

According to a second aspect of the disclosure, there is provided a tape including a sheet having an elongated rectangular shape, a label affixed to the sheet and subjected to printing by a printing device, and an attachment portion affixed to the sheet and configured to be affixed to an object with maintaining connection to the label. The attachment portion is affixed to the sheet in a state separate from the label.

According to a third aspect of the disclosure, there is provided a tape including a sheet having an elongated rectangular shape, a label affixed to the sheet and subjected to printing by a printing device, and an attachment portion affixed to the sheet and configured to be affixed to an object with maintaining connection to the label. The attachment portion and the label are integrally connected through a portion thinner than the attachment portion.

According to a fourth aspect of the disclosure, there is provided a tape cartridge including a casing, a tape roll which is a winding of a tape and is accommodated in the casing, and an ink ribbon roll. The tape includes a release sheet having an elongated rectangular shape, the release sheet having a length in a first direction greater than a length in a second direction perpendicular to the first direction, a main label portion having a rectangular shape including a first short side and a first long side, the main label portion being affixed to the release sheet with directing the first long side in one of the first direction and the second direction, and a subordinate label portion having a rectangular shape including a second short side shorter than the first short side and a second long side, the subordinate label portion being separate from the main label portion or being integrally connected to the main label portion through a minute connecting portion having a width smaller than that of the subordinate label portion. The subordinate label portion is affixed to the release sheet in one of the following manners: (i) the second long side extends in the first direction, and the subordinate label portion is arrayed with the main label portion in the first direction; (ii) the second long side extends in the first direction, and the subordinate label portion is arrayed with the main label portion in the second direction; and (iii) the second long side extends in the second direction, and the subordinate label portion is arrayed with the main label portion in the first direction. The ink ribbon roll is a winding of an ink ribbon and is accommodated in the casing.

According to a fifth aspect of the disclosure, there is provided a tape cartridge including a casing, a tape roll which is a winding of a tape and is accommodated in the casing, and an ink ribbon roll which is a winding of an ink ribbon and is accommodated in the casing. The tape includes a sheet having an elongated rectangular shape, a label affixed to the sheet and subjected to printing by a printing device, and an attachment portion affixed to the sheet and configured to be affixed to an object with maintaining connection to the label, the attachment portion being affixed to the sheet in a state separate from the label.

According to a six aspect of the disclosure, there is provided a tape cartridge including a casing, a tape roll which is a winding of a tape and is accommodated in the casing, and an ink ribbon roll which is a winding of an ink ribbon and is accommodated in the casing. The tape includes a sheet having an elongated rectangular shape, a label affixed to the sheet and subjected to printing by a printing device, and an attachment portion affixed to the sheet and configured to be affixed to an object with maintaining connection to the label, the attachment portion and the label being integrally connected through a portion thinner than the attachment portion.

While the description has been made in detail with reference to the embodiments thereof, it would be apparent to those skilled in the art that many modifications and variations may be made therein without departing from the spirit of the disclosure.

What is claimed is:

1. A tape comprising:
    a release sheet having an elongated rectangular shape, the release sheet having a length in a first direction greater than a length in a second direction perpendicular to the first direction;
    a main label portion affixed to the release sheet and containing a fold line extending in the first direction, the main label portion having a center portion in the second direction where the fold line extends in the first direction; and
    a subordinate label portion affixed to the release sheet and arrayed with the main label portion in the first direction, the subordinate label portion being separate from the main label portion and having a length in the second direction not more than a length from one end in the second direction of the main label portion to the fold line.

2. The tape according to claim 1, wherein the main label portion has one end and another end in the first direction, and the subordinate label portion has one end and another end in the first direction, the other end of the subordinate label portion being closer to the one end of the main label portion than the one end of the subordinate label portion is to the one end of the main label portion in the first direction, the one end of the main label portion being away from the other end of the subordinate label portion in the first direction.

3. The tape according to claim 1, wherein the main label portion has one end and another end in the first direction, and the subordinate label portion has one end and another end in the first direction, the other end of the subordinate label portion being closer to the one end of the main label portion than the one end of the subordinate label portion is to the one end of the main label portion in the first direction, the one end of the main label portion being in contact with the other end of the subordinate label portion in the first direction.

4. The tape according to claim 1, wherein the subordinate label portion comprises a first subordinate label portion, and a second subordinate label portion arrayed with the first subordinate label portion in the second direction.

5. The tape according to claim 4, wherein the first subordinate label portion has one end and another end in the second direction, and the second subordinate label portion has one end and another end in the second direction, the other end of the second subordinate label portion being closer to the one end of the first subordinate label portion than the one end of the second subordinate label portion is to the one end of the first subordinate label portion in the second direction, the one end of the first subordinate label portion being away from the other end of the second subordinate label portion in the second direction.

6. The tape according to claim 4, wherein the first subordinate label portion has one end and another end in the second direction, and the second subordinate label portion has one end and another end in the second direction, the other end of the second subordinate label portion being closer to the one end of the first subordinate label portion than the one end of the second subordinate label portion is to the one end of the first subordinate label portion in the second direction, the one end of the first subordinate label portion being in contact with the other end of the second subordinate label portion in the second direction.

7. The tape according to claim 4, wherein the first subordinate label portion and the second subordinate label portion are positioned symmetrically with respect to a symmetrical axis extending in the first direction and passing through a center in the second direction of the release sheet.

8. The tape according to claim 1, wherein the subordinate label portion is positioned at a center portion in the second direction of the release sheet.

9. The tape according to claim 1, wherein the main label portion and the subordinate label portion have rectangular shape.

10. The tape according to claim 1, wherein the main label portion is singular, and the subordinate label portion is at least singular, the single main label portion and the at least single subordinate label portion being in a form of a set, and a plurality of the set being affixed to the release sheet and arrayed in the first direction with a posture identical to one another.

11. The tape according to claim 1, wherein the subordinate label portion has a marker for winding purposes, the marker being at a position other than a center in the first direction of the subordinate label portion.

12. The tape according to claim 1, wherein the subordinate label portion has one endmost portion and another endmost portion in the first direction, the one endmost portion and the other endmost portion being at different positions from each other in the second direction.

13. The tape according to claim 1, wherein the subordinate label portion has one endmost portion and another endmost portion in the first direction, the one endmost portion having a length in the second direction different from a length of the other endmost portion in the second direction.

14. The tape according to claim 1, wherein an adhesive sheet is affixed on a first surface of the release sheet, cut lines being formed in the adhesive sheet to segment the main label portion, the subordinate label portion, and a non-label portion.

15. The tape according to claim 1, wherein an adhesive sheet having a shape identical to a shape of the release sheet is affixed on a first surface of the release sheet, the adhesive sheet being divided exclusively into the main label portion and the subordinate label portion by cut lines.

16. The tape according to claim 1, wherein the release sheet has an exposed portion at a position other than portions at which the main label portion and the subordinate label portion are affixed to the release sheet.

17. The tape according to claim 1, wherein the subordinate label portion has a length in the second direction greater than that in the first direction.

18. The tape according to claim 1, wherein the subordinate label portion is stuck to the release sheet such that the subordinate label portion is arrayed with the main label portion in the second direction.

19. A tape cartridge comprising:
a casing;
a tape roll which is a winding of a tape and is accommodated in the casing, the tape comprising:
a release sheet having an elongated rectangular shape, the release sheet having a length in a first direction greater than a length in a second direction perpendicular to the first direction;
a main label portion affixed to the release sheet and containing a fold line extending in the first direction, the main label portion having a center portion in the second direction where the fold line extends in the first direction; and
a subordinate label portion affixed to the release sheet and arrayed with the main label portion in the first direction and the second direction, the subordinate label portion being separate from the main label portion and having a length in the second direction not more than a length in the second direction from one end of the main label portion to the fold line; and
an ink ribbon roll which is a winding of an ink ribbon and is accommodated in the casing.

20. A tape comprising:
a release sheet having an elongated rectangular shape, the release sheet having a length in a first direction greater than a length in a second direction perpendicular to the first direction;
a main label portion affixed to the release sheet and containing a fold line extending in the first direction, the main label portion having a center portion in the second direction where the fold line extends in the first direction; and
a subordinate label portion affixed to the release sheet and arrayed with the main label portion in one of the first direction and the second direction, the subordinate label portion being separate from the main label portion and having a length in at least one of the first direction and the second direction not more than a length from one end in the second direction of the main label portion to the fold line.

21. The tape according to claim 20, wherein the subordinate label portion has a length in one of the first direction and the second direction not more than a length from one end in the second direction of the main label portion to the fold line, and a length in another of the first direction and the second direction more than the length from the one end in the second direction of the main label portion to the fold line.

22. A tape comprising:
a release sheet having an elongated rectangular shape, the release sheet having a length in a first direction greater than a length in a second direction perpendicular to the first direction;
a main label portion affixed to the release sheet and containing a fold line extending in the second direction, the main label portion having a center portion in the first direction where the fold line extends in the second direction; and
a subordinate label portion affixed to the release sheet and arrayed with the main label portion in one of the first direction and the second direction, the subordinate label portion being separate from the main label portion and having a length in at least one of the first direction and the second direction not more than a length from one end in the first direction of the main label portion to the fold line.

23. The tape according to claim 22, wherein the subordinate label portion has a length in one of the first direction and the second direction not more than a length from one end in the first direction of the main label portion to the fold line, and a length in another of the first direction and the second direction more than the length from the one end in the first direction of the main label portion to the fold line.

* * * * *